United States Patent
Pangrazio et al.

(10) Patent No.: US 8,716,609 B2
(45) Date of Patent: May 6, 2014

(54) WEIGHING APPARATUS AND ROLL-OFF TRUCK, AND ASSOCIATED METHOD

(75) Inventors: John Alan Pangrazio, Island Lake, IL (US); Alec Femec, Kent, OH (US)

(73) Assignee: LTS Scale Company, LLC, Twinsburg, OH (US)

( * ) Notice: Subject to any disclaimer, the term of this patent is extended or adjusted under 35 U.S.C. 154(b) by 184 days.

(21) Appl. No.: 13/230,951

(22) Filed: Sep. 13, 2011

(65) Prior Publication Data

US 2013/0062127 A1    Mar. 14, 2013

(51) Int. Cl.
*G01G 19/08* (2006.01)

(52) U.S. Cl.
USPC .......................................................... 177/136

(58) Field of Classification Search
USPC .................................................. 177/136–141
See application file for complete search history.

(56) References Cited

U.S. PATENT DOCUMENTS

| | | | |
|---|---|---|---|
| 654,329 A | 7/1900 | Schneider | |
| 1,338,593 A | 4/1920 | Schnurr | |
| 1,369,238 A | 2/1921 | Guldbrandsen | |
| 2,109,460 A | 3/1938 | Brasher | |
| 2,756,983 A * | 7/1956 | Furcini | 177/139 |
| 3,199,619 A | 8/1965 | Hathaway | |
| 3,279,550 A | 10/1966 | Kersten | |
| 3,773,123 A | 11/1973 | Martinez de Castro Lopez | |
| 4,540,057 A | 9/1985 | Freeman | |
| 4,589,507 A * | 5/1986 | Curran | 177/138 |
| 4,606,419 A | 8/1986 | Perini | |
| 4,673,048 A | 6/1987 | Curran | |
| 4,706,768 A | 11/1987 | Kozozian et al. | |
| 4,905,780 A | 3/1990 | Goff, III | |
| 5,369,222 A * | 11/1994 | Strelioff | 177/136 |
| 5,376,761 A | 12/1994 | Koch et al. | |
| 5,393,936 A * | 2/1995 | Tyhy et al. | 177/138 |
| 5,578,798 A * | 11/1996 | Nuyts | 177/136 |
| 5,635,680 A * | 6/1997 | Dojan | 177/136 |
| 5,739,478 A | 4/1998 | Zefira | |
| 5,773,768 A * | 6/1998 | Nuyts | 177/136 |
| 5,789,714 A * | 8/1998 | Doerksen | 177/141 |
| 5,861,580 A | 1/1999 | Moore et al. | |
| 6,118,083 A * | 9/2000 | Boyovich et al. | 177/136 |
| 6,703,569 B2 * | 3/2004 | Moore et al. | 177/136 |
| 6,852,933 B2 | 2/2005 | Messerle | |
| 6,858,809 B2 | 2/2005 | Bender | |

* cited by examiner

*Primary Examiner* — Randy W Gibson
*Assistant Examiner* — Natalie Huls
(74) *Attorney, Agent, or Firm* — Eckert Seamans Cherin & Mellott, LLC; Brij K. Agarwal

(57) ABSTRACT

An improved method of determining the weight of the contents of a container involves using a roll-off truck's own container loading system to remove a container from a number of weight measure elements. Another improved method of weighing the contents of a container involves employing support elements which enable a container that is engaged with the number of weight measurement elements to be lowered out of engagement with such weight measurement elements. An improved weighing apparatus includes a number of weight measurement elements and a number of support elements. Such an improved weighing apparatus can be retrofitted onto an existing truck to provide an improved truck on which such methods can be performed.

4 Claims, 20 Drawing Sheets

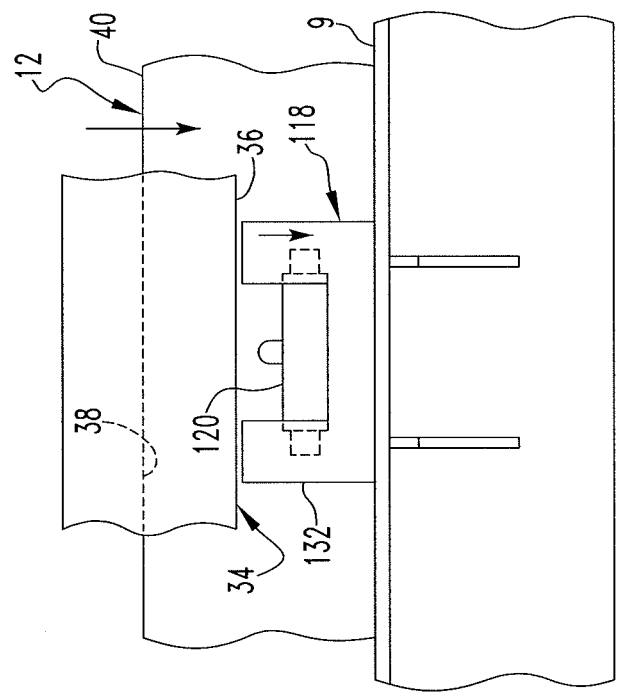
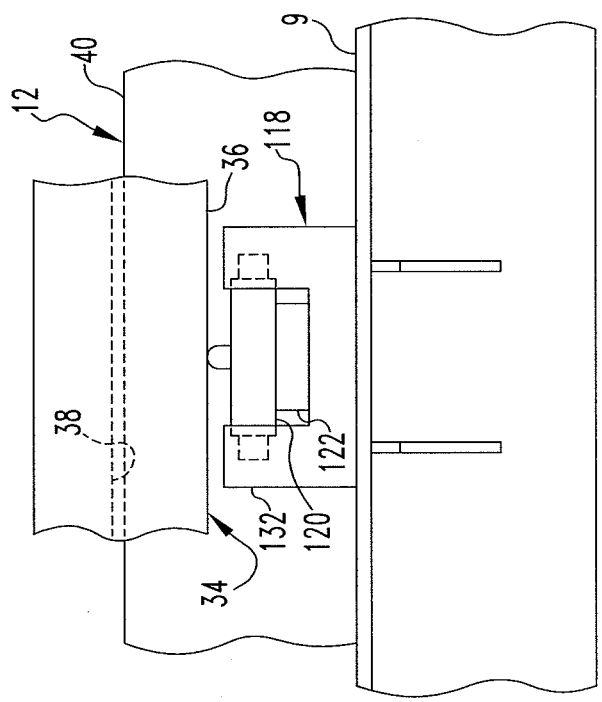

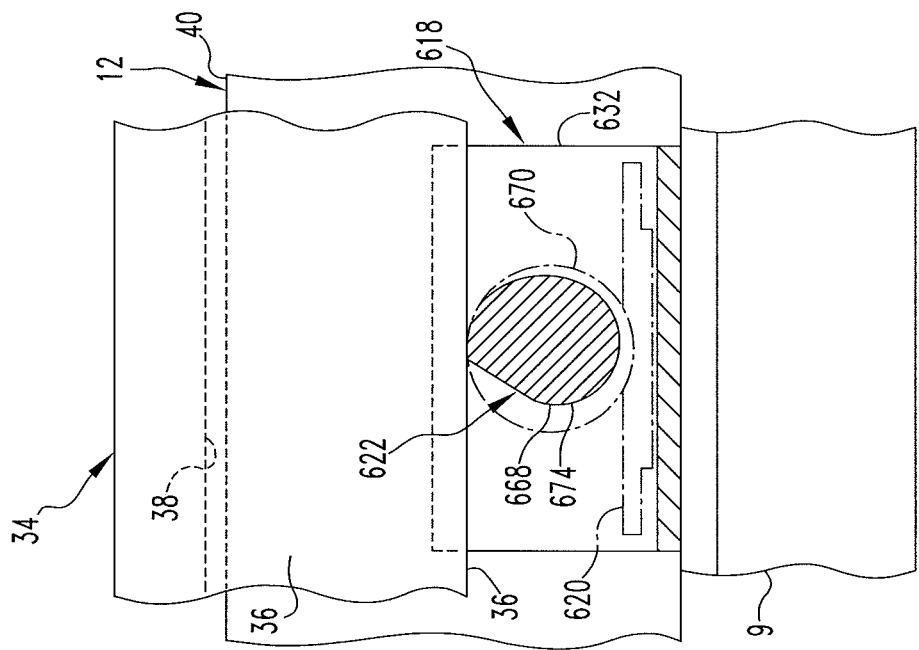
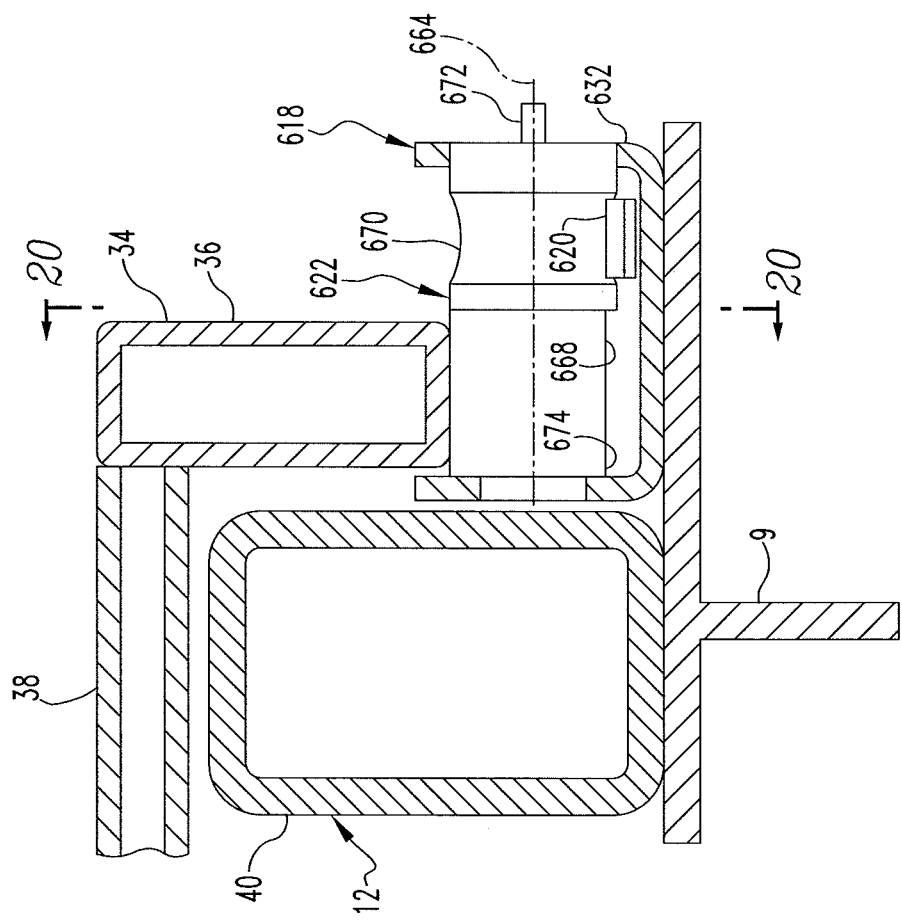

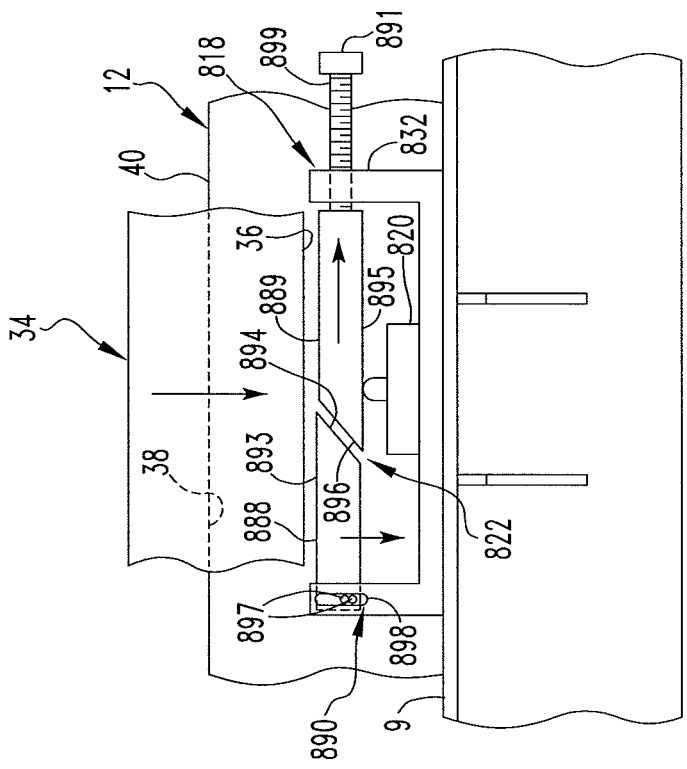
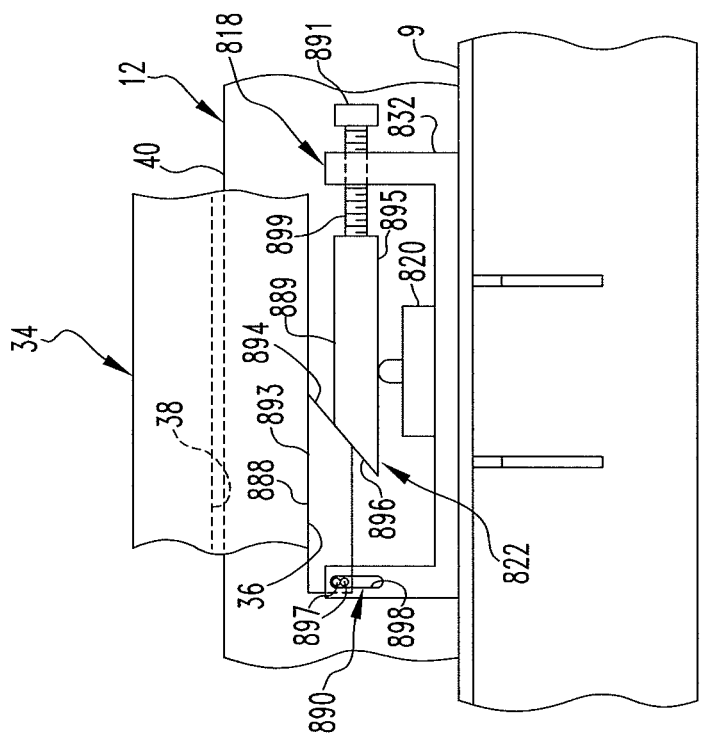

WEIGHING APPARATUS AND ROLL-OFF TRUCK, AND ASSOCIATED METHOD

BACKGROUND

1. Field

The disclosed and claimed concept relates generally to an apparatus and method for weighing and, more particularly, to an apparatus and method for weighing the contents of a container that is carried by a roll-off truck.

2. Related Art

Roll-off trucks and containers are employed in numerous diverse applications. For instance, a container may be deposited by a roll-off truck at a construction site, and refuse from the construction site is gradually placed into the container. The roll-off truck may periodically return to the construction site and remove the container for dumping at another location, after which the empty container may be returned to the construction site. By way of further example, several containers may be located at a recycling facility, with desirable materials such as aluminum, copper, and steel being placed in separate containers for recycling purposes and with refuse materials being placed in another container.

Depending upon the needs of the application, the containers may be removed by a roll-off truck for dumping in various circumstances. For instance, in some circumstances the container may be dumped once it has been filled to a predetermined proportion of its capacity. Alternatively, the container may be removed for dumping according to a periodic schedule regardless of the extent to which the container is filled, by way of example.

As a general matter, it is desirable to ascertain the weight, i.e., mass, of the contents of the container for various purposes. For instance, in a refuse dumping operation, the weight of the contents is typically used as at least one of the criteria in calculating the charges that are to be billed to the person who generated the refuse. In a recycling operation, the weight of the recyclable material in the container is typically used as at least one of the criteria employed in determining the amount that is to be paid to the person who collected the recyclable materials.

While previously known systems for determining the weight of the contents of a container have generally been effective for their intended purposes, they have not been without limitation. For instance, it has been known to provide a scale at a dumping site to determine the weight of the contents of a container by weighing the truck with the container and its contents prior to dumping and by also weighing the truck and the empty container after dumping in order to calculate from the two weight values the weight of the contents that were dumped. However, such scales are expensive to install and are also costly to operate since a person typically must be employed to take and record measurements. Moreover, since a dumping facility typically will have only one such scale, and all of the trucks and their containers must be weighed twice with each dumping operation, i.e., before and after dumping, trucks can sometimes be required to wait in long lines in order for the weighing operations to be performed. Such waiting is wasteful both in terms of labor and truck time, and the fuel that is consumed in such waiting typically is not factored into the net weight that is calculated from the two weighing operations, which leads to inaccuracy.

It has also been known to provide certain weighing systems on the roll-off trucks themselves. In order for such weighing systems to be used for their intended purposes, i.e., for the purposes of making weight measurements of sufficient accuracy that they can be employed in calculating dollar amounts that are to be paid from one person to another, such a weighing system must be "legal for trade". However, a weighing system that is "legal for trade" typically includes components that are highly sensitive, and a container with its contents may weigh upwards of twenty tons or more. As such, while the load cells or other weight measurement elements must be engaged by the container in order to provide a weight measurement, the container must be disengaged from such load cells prior to transport of the container. This is because load cells of such "legal for trade" accuracy cannot withstand the abuse that would be experienced if the load cells were engaged by a container while the truck is driven on a roadway. While it has also been known to provide on such a truck lifting structures that can raise a container out of engagement with the load cells after a weight measurement has been recorded, such systems have been undesirably costly due to the required robustness and ability to lift weights of twenty tons or more.

SUMMARY

An improved weighing apparatus and roll-off truck, and an improved method, advantageously address these and other shortcomings of the known art. An improved method of determining the weight of the contents of a container involves using a roll-off truck's own container loading system to remove a container from a number of weight measure elements to enable an operator to change the number of weight elements from one condition to another condition so that the container is not engaged with the weight measurement elements when reloaded onto the roll-off truck. Another improved method of weighing the contents of a container involves employing support elements which enable a container that is engaged with the number of weight measurement elements to be lowered out of engagement with such weight measurement elements, it being understood that the lowering of a heavy object typically takes less effort than the lifting of the same object. An improved weighing apparatus that can be employed in performing these methods includes a number of weighing devices that typically each include a weight measurement element and a support element, with the support element being movable between a first position and a second position to enable the weight measurement elements to be switched between a first condition engageable by the container and a second condition disengaged from the container. Such an improved weighing apparatus can be retrofitted onto an existing truck to provide an improved truck on which such methods can be performed.

Accordingly, an aspect of the disclosed and claimed concept is to provide an improved method of determining the weight of a quantity of material that is situated in a container of a type that is transported on a roll-off truck.

Another aspect of the disclosed and claimed concept is to provide an improved weighing apparatus that can be employed in performing such an improved method.

Another aspect of the disclosed and claimed concept is to provide an improved truck that includes such a weighing apparatus.

These and other aspects of the disclosed and claimed concept are provided by an improved weighing apparatus that is structured to be mounted to a platform apparatus of a roll-off truck. The platform apparatus has a vehicle frame and a movable platform. The weighing apparatus is further structured to determine a weight of a quantity of material that is situated in a container which is structured to be disposed on the roll-off truck. The weighing apparatus can be generally stated as including a number of weighing devices that comprise a number of weight measurement elements and a number of support elements. The number of weight measurement elements are changeable between a first condition and a second condition and are structured to be situated on at least one of the vehicle frame and the movable platform. The number of weight measurement elements in the first condition are structured to be engaged by the container with the quantity of material and to generate a number of outputs representative of a combined weight of the container and the quantity of material. The number of support elements are movable between a first position in which the number of weight measurement elements are in the first condition and a second position in which the number of weight measurement elements are in the second condition. The number of support elements in the first position are engaged with the number of weight measurement elements, and the number of support elements in at least the first position are structured to be further engaged with at least one of the container, the vehicle frame, and the movable platform. The number of support elements are structured to be movable from the first position toward the second position when the container is removed from engagement with the number of weight measurement elements. The number of weight measurement elements in the second condition are structured to be disengaged from the container when the container is engaged with the platform apparatus. The number of support elements are structured to be returnable from the second position to the first position when at least a portion of the movable platform is spaced from the vehicle frame. The number of weight measurement elements returned to the first condition are structured to be engaged by the container without the quantity of material and to generate another number of outputs representative of a weight of the container without the quantity of material.

Other aspects of the disclosed and claimed concept are provided by an improved weighing apparatus that is structured to be mounted to a platform apparatus of a roll-off truck, the platform apparatus having a vehicle frame and a movable platform. The weighing apparatus is further structured to determine a weight of a quantity of material that is situated in a container which is structured to be disposed on the roll-off truck. The weighing apparatus can be generally stated as including a number of weighing devices that comprise a number of weight measurement elements and a number of support elements. The number of weight measurement elements are changeable between a first condition and a second condition and are structured to be situated on at least one of the vehicle frame and the movable platform. The number of weight measurement elements in the first condition are structured to be engaged by the container with the quantity of material and to generate a number of outputs representative of a combined weight of the container and the quantity of material. The number of support elements are movable between a first position in which the number of weight measurement elements are in the first condition and a second position in which the number of weight measurement elements are in the second condition. The number of support elements in the first position are engaged with the number of weight measurement elements. The number of support elements in at least the first position are structured to be further engaged with at least one of the container, the vehicle frame, and the movable platform. The number of support elements are structured to be movable from the first position having the container engaged with the number of weight measurement elements toward the second position having the container engaged with the platform apparatus and disengaged from the number of weight measurement elements. The number of support elements are structured to be returnable from the second position to the first position when at least a portion of the movable platform is spaced from the vehicle frame. The number of weight measurement elements returned to the first condition are structured to be engaged by the container without the quantity of material and to generate another number of outputs representative of a weight of the container without the quantity of material.

Other aspects of the disclosed and claimed concept are provided by an improved weighing apparatus that is structured to be mounted to a platform apparatus of a roll-off truck, the platform apparatus comprising a vehicle frame and a movable platform, the weighing apparatus being further structured to determine a weight of a quantity of material that is situated in a container which is structured to be disposed on the roll-off truck. The weighing apparatus can be generally stated as including a number of weighing devices that comprise a number of weight measurement elements that are each changeable between a first condition and a second condition and are structured to be situated on the platform apparatus in the first condition. The number of weight measurement elements in the first condition are structured to be engaged by the container with the quantity of material and to generate a number of outputs representative of a combined weight of the container and the quantity of material. The number of weight measurement elements are structured to be removable from the platform apparatus to be in the second position when the container is removed from engagement with the number of weight measurement elements. The number of support elements are structured to be returnable from the second position to the first position when at least a portion of the movable platform is moved away from at least a portion of the vehicle frame. The number of weight measurement elements returned to the first condition are structured to be engaged by the container without the quantity of material and to generate another number of outputs representative of a weight of the container without the quantity of material.

Other aspects of the disclosed and claimed concept are provided by an improved weighing apparatus that is structured to be mounted to a platform apparatus of a roll-off truck and that is further structured to determine a weight of a quantity of material that is situated in a container which is structured to be disposed on the roll-off truck. The weighing apparatus can be generally stated as including a number of weighing devices that comprise a number of weight measurement elements and a number of support elements. The number of weight measurement elements are changeable between a first condition and a second condition and are structured to be situated on the platform apparatus. The number of weight measurement elements in the first condition are structured to be engaged by the container with the quantity of material and to generate a number of outputs representative of a combined weight of the container and the quantity of material. The number of weight measurement elements in the second condition are structured to be disengaged from the container disposed on the roll-off truck. The number of support elements each include a number of one-way rollers and an eccentric element and are pivotable between a first position in which the number of weight measurement elements are in the first condition and a second position in which the number of weight measurement elements are in the second condition. The number of one-way rollers in the first position of the support element are structured to be engaged with the container and to permit rolling engagement by the container moving in a first direction. The number of one-way rollers are further structured to resist rolling engagement by the container moving in a second direction opposite the first direction and to responsively pivot the support element from the first position toward the second position. The number of support elements are structured to be returnable from the second position to the first position when the container is removed from engagement with the platform apparatus. The number of weight measurement elements returned to the first condition are structured to be engaged by the container without the quantity of material and to generate another number of outputs representative of a weight of the container without the quantity of material.

Other aspects of the disclosed and claimed concept are provided by an improved method of determining a weight of a quantity of material that is situated in a container. The method can be generally stated as including loading the container with the quantity of material into engagement with a number of weight measurement elements that are situated on a platform apparatus and are in a first condition, detecting from the number of weight measurement elements a number of outputs representative of a combined weight of the container and the quantity of material, removing the container with the quantity of material from the number of weight measurement elements to cause the container and the number of weight measurement elements to become disengaged and, subsequent to the removing of the container with the quantity of material from the number of weight measurement elements, moving a number of support elements situated between the number of weight measurement elements and at least one of the container and the platform apparatus to change the number of weight measurement elements to be in a second condition. The method can be stated as further including loading the container with the quantity of material onto the platform apparatus with the number of weight measurement elements in the second condition and disengaged from the container, removing the container with the quantity of material from the platform apparatus, repositioning the support element to return the number of weight measurement elements to the first condition subsequent to the removing of the container with the quantity of material from the platform apparatus, loading the container without the quantity of material into engagement with the number of weight measurement elements in the first condition, detecting from the number of weight measurement elements another number of outputs representative of a weight of the container without the quantity of material, and determining from the number of outputs and the another number of outputs a weight of the quantity of material.

Other aspects of the disclosed and claimed concept are provided by an improved method of determining a weight of a quantity of material that is situated in a container. The method can be generally stated as including loading the container with the quantity of material into engagement with a number of weight measurement elements that are situated on a platform apparatus and are in a first condition, detecting from the number of weight measurement elements a number of outputs representative of a combined weight of the container and the quantity of material, and moving a number of support elements situated between the number of weight measurement elements and at least one of the container and the platform apparatus to perform operations that include: changing the number of weight measurement elements to be in a second condition; causing the container and the number of weight measurement elements to become disengaged; and causing the container with the quantity of material to be engaged with the platform apparatus. The method can be stated as further including removing the container with the quantity of material from the platform apparatus, repositioning the support element to return the number of weight measurement elements to the first condition subsequent to the removing of the container with the quantity of material, loading the container without the quantity of material into engagement with the number of weight measurement elements in the first condition, detecting from the number of weight measurement elements another number of outputs representative of a weight of the container without the quantity of material, and determining from the number of outputs and the another number of outputs a weight of the quantity of material.

BRIEF DESCRIPTION OF THE DRAWINGS

A further understanding of the disclosed and claimed concept can be gained from the following Description when read in conjunction with the accompanying drawings in which:

FIG. 9 is a diagrammatic depiction of an improved weighing device that can be used in a second embodiment of the weighing apparatus, with the weighing device being in a first condition;

FIG. 10 is a view similar to FIG. 9, except depicting the weighing device in a second condition;

FIG. 19 is a view of an improved weighing device that can be used in a seventh embodiment of the weighing apparatus, with the weighing device being depicted in a first condition;

FIG. 20 is a sectional view as taken along line 20-20 of FIG. 19;

FIG. 28 is a diagrammatic depiction of an improved weighing device that can be used in a ninth embodiment of the weighing apparatus, with the weighing device being in a first condition;

FIG. 29 is a view similar to FIG. 28, except depicting the weighing device in a second condition.

Similar numerals refer to similar parts throughout the specification.

DESCRIPTION

An improved weighing apparatus 1 in accordance with a first embodiment of the disclosed and claimed concept is depicted as being installed on an improved roll-off truck 2 in accordance with the disclosed and claimed concept. As is generally understood in the relevant art, the roll-off truck 2 is employed to transport a container 3 from one location to another. As employed herein, the expression "roll-off truck" and variations thereof shall refer broadly to any vehicle having a mechanism that enables the loading thereon, the transport from one location to another, and the unloading therefrom of a container. As employed herein, the expression "container" and variations thereof shall refer broadly to a receptacle that typically remains at a given location for a period of time during which materials are periodically added thereto, and which is periodically loaded onto a roll-off truck for transport to another location for dumping, after which the receptacle may be returned to the original location or to a different location for further filling with materials.

Figure 1:
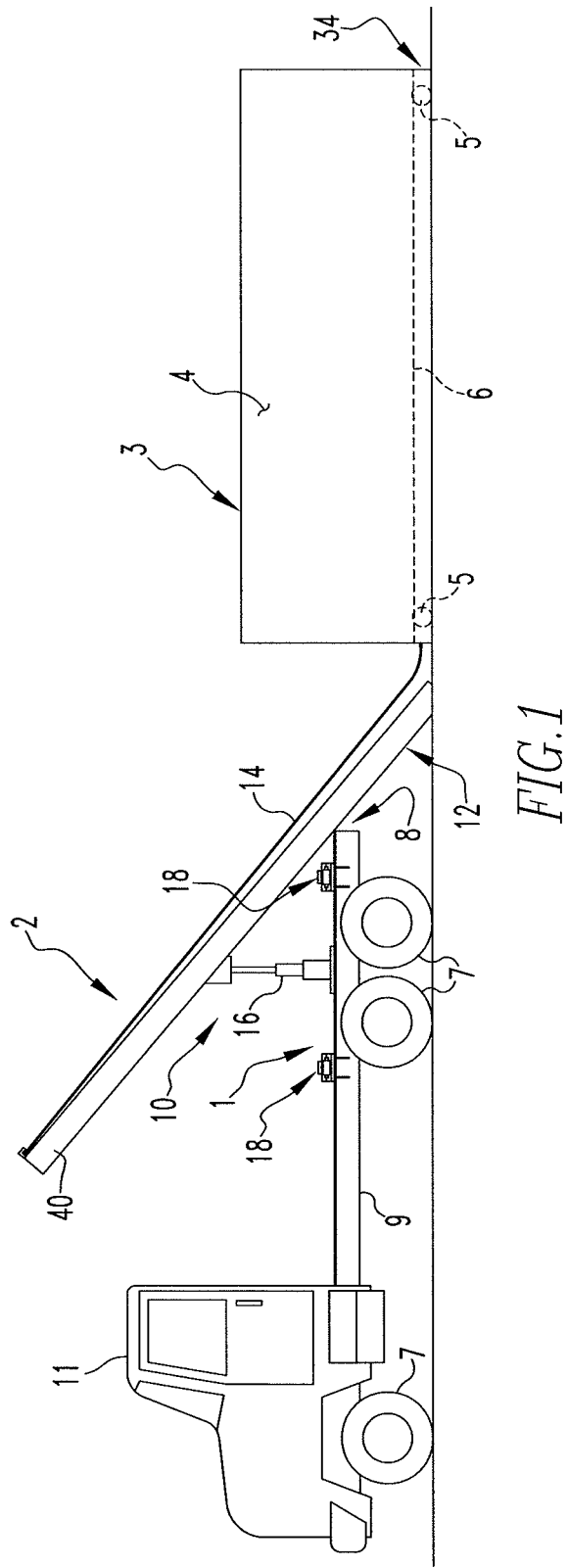
FIG. 1 is a diagrammatic view of an improved roll-off truck in accordance with the disclosed and claimed concept having an improved weighing apparatus in accordance with the disclosed and claimed concept and depicting a container on the ground in a condition unloaded from the roll-off truck.

The container 3 is depicted in a schematic fashion in FIG. 1 and includes a receptacle 4 that is formed of frame elements and plates to form an enclosure that typically is open on the top for the reception of materials therein. FIG. 1 depicts the container 3 as having a number of rollers 5 and as having a channel 6 formed in an underside thereof. The rollers 5 and the channel 6 are depicted only in FIG. 1 and not in the other figures for purposes of simplicity.

The schematically depicted roll-off truck 2 includes a plurality of wheels 7 that roll on the ground and further comprises a platform apparatus 8 that is disposed on the wheels 7. The platform apparatus 8 includes a vehicle frame 9 and a loading apparatus 10. More particularly, the vehicle frame 9 is directly connected with the wheels 7, and the loading apparatus 10 is mounted to the vehicle frame 9 in the depicted exemplary embodiment. The roll-off truck 2 further includes a cab 11 mounted to the vehicle frame 9.

The loading apparatus 10 is depicted in FIG. 1 as including a movable platform 12 that is movably mounted on the vehicle frame 9, a retractable cable 14 which extends from one end of the movable platform 12 and is connectable with the container 3, and a hydraulic lift cylinder 16 that extends between the vehicle frame 9 and the movable platform 12. As can be understood from FIGS. 1, 3, and other figures herein, the movable platform 12 is pivotably mounted to the vehicle frame 9 at approximately its rear-most region. It is understood, however, that other embodiments of the roll-off truck 2 may have a movable platform that is movable in other fashions without departing from the present concept.

Figure 3:
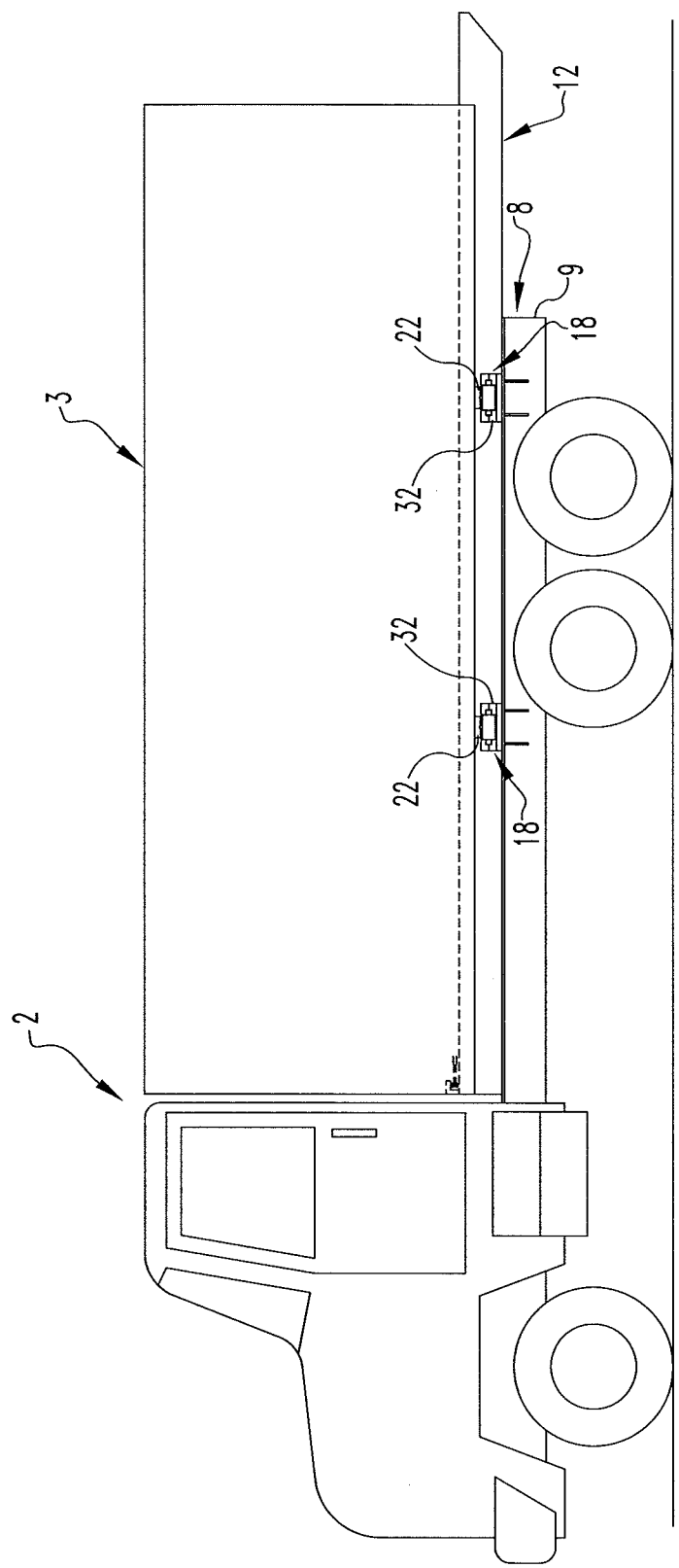
FIG. 3 is a depiction of the roll-off truck and weighing apparatus of FIG. 1 with the container being loaded on the roll-off truck and being engaged with a number of weighing devices of the weighing apparatus.

As can be understood from FIGS. 1 and 3, and as is understood in the relevant art, the container 3 that is situated on the ground is loaded onto the roll-off truck 2 by connecting the cable 14 with the container 3 and operating a winch (not expressly depicted herein) or other mechanism to retract the cable 14, whereby the container 3 is pulled onto the movable platform 12. In so doing, the movable platform 12 is received in the channel 6 formed in the underside of the container 3. The hydraulic lift cylinder 16 is collapsed to cause the movable platform 12 with the container 3 situated thereon to pivot downward from its inclined position to a position generally horizontal as is depicted generally in FIG. 3. It is understood that the movable platform 12 may additionally include its own rollers or other structures that are not expressly depicted herein but that are within the scope of the present concept.

The advantageous weighing apparatus 1 can be said to comprise four weighing devices 18, only two of which are depicted in FIGS. 1, 3, 5 and 6. The weighing apparatus 1 further includes a control apparatus 19, such as is depicted generally in FIG. 2. More particularly, and as will be set forth in greater detail below, each weighing device 18 includes a weight measurement element 20 and a support element 22, such as are depicted generally in FIG. 4. The weight measurement elements 20 are in the form of sensors and, more particularly, in the form of load cells which are indicated with the numerals 20A, 20B, 20C, and 20D, and which are collectively referred to with the numeral 20.

Figure 2:
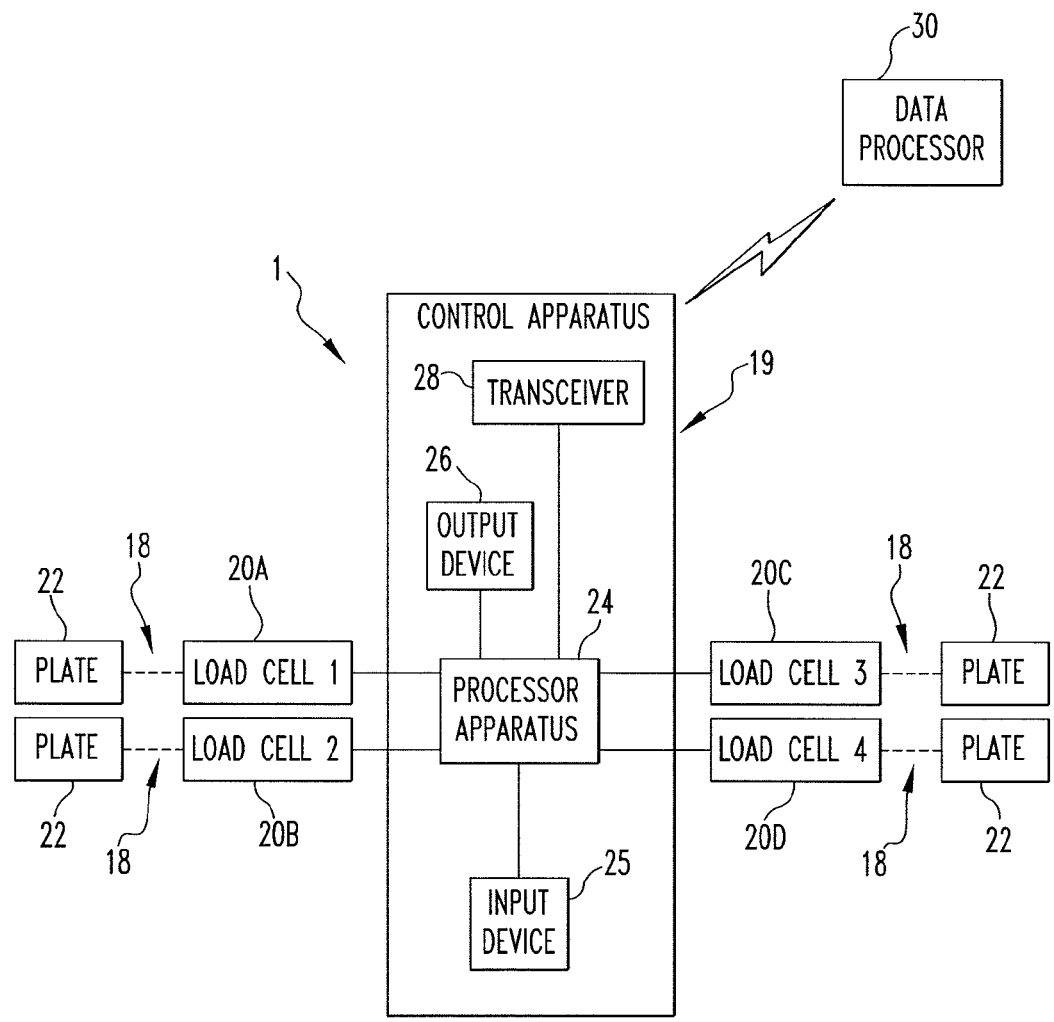
FIG. 2 is a schematic depiction of the weighing apparatus of FIG. 1.

The control apparatus 19 is depicted in FIG. 2 as including a processor apparatus 24 to which the load cells 20A, 20B, 20C, and 20D are electronically connected. In this regard, while a wired connection between the load cells 20 and the processor apparatus 24 is depicted in FIG. 2, it is understood that wireless or other types of connections can be provided therebetween without departing from the present concept. The load cells 20 generate outputs which, in the depicted exemplary embodiment, are in the form of signals that are received by the processor apparatus 24. It is noted, however, that the various outputs from the load cells 20 potentially could, in other embodiments, be manually or otherwise input into the processor apparatus 24 without departing from the present concept.

The processor apparatus 24 can be said to include a processor, such as a microprocessor or other type of processor, and an array of memory which can include any of a variety of RAM, ROM, EPROM, EEPROM, FLASH, and the like without limitation. The memory interfaces with the processor. As is generally understood in the relevant art, the memory typically will have one or more routines stored therein which are executable on the processor to cause the weighing apparatus 1 to perform certain operations.

As can further be understood from FIG. 2, the control apparatus 19 comprises an input device 25, an output device 26, and a transceiver 28, all of which are connected with the processor apparatus 24. The input device 25 may be a keyboard, keypad, or other such input device, which may also include one or more electronic inputs such as a Universal Serial Bus (USB) port and the like without limitation. The output device 26 may be a display or other type of visual or audible output device without limitation. Moreover, the input device 25 and the output device 26 may together be in the form of a touch-sensitive display or other device. The transceiver 28 is configured to wirelessly communicate data between it and a remote data processor 30 which may be any type of remote computer or data storage device. It is understood in this regard that data need not be wirelessly communicated between the processor apparatus 24 and the data processor 30, and it is expressly noted that such data can be transferred via wires therebetween or can be transferred manually therebetween, such as by manually keying data into the data processor 30 or by manually carrying an electronic memory device between a USB port on the control apparatus 19 and a similar USB port on the data processor 30, by way of example. Other configurations of the control apparatus 19 can be employed without departing from the present concept.

Figure 4:
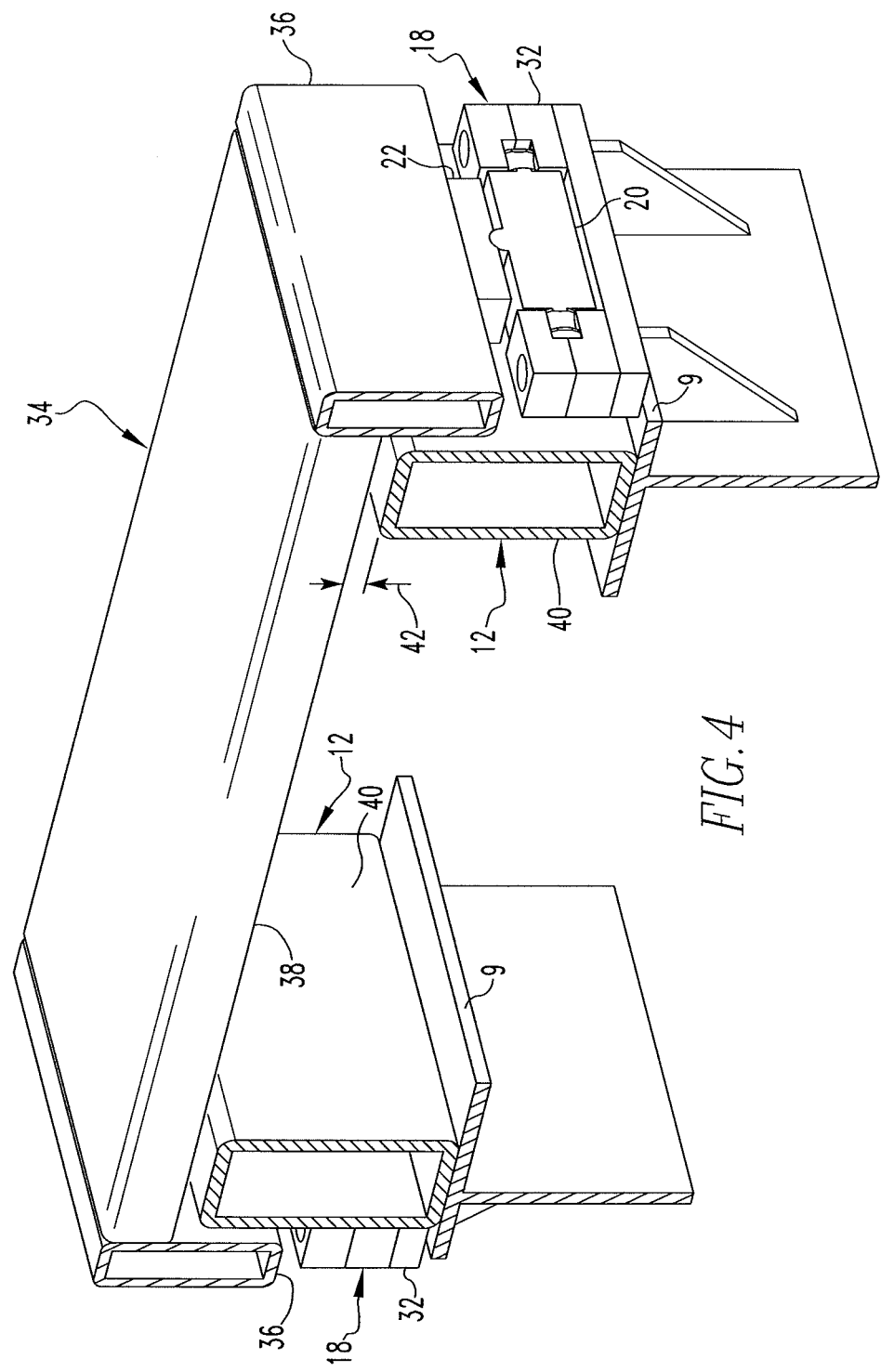
FIG. 4 is a sectional view as taken along line 4-4 of FIG. 3 depicting a first embodiment of the weighing device.

As can be understood from FIGS. 3 and 4, a first embodiment of the weighing devices 18 include a bracket 32 that is affixed to the vehicle frame 9 and that carries a load cell 20. In the exemplary first embodiment depicted generally in FIG. 4, the support element 22 is in the form of a rectangular plate of a material such as steel and has a thickness in the range of about ⅜ inch to one inch depending upon the needs of the particular application. FIG. 4 further depicts a container frame 34 of the container 3 which can be said to include a pair of side frame elements 36 and a number of transverse frame elements 38 that extend between the pair of side frame elements 36. Plates and other frame elements (not expressly depicted in FIG. 4) are connected with the side frame elements 36 and/or the transverse frame elements 38 in order to form the receptacle 4 of the container 3.

In FIG. 4, the side frame elements 36 of the container frame 34 are depicted as being situated atop the support elements 22, and the support elements 22 are depicted as being situated atop the load cells 20. The side frame elements 36 and thus the container 3 can therefore said to be engaged with the support elements 22 and can also be said to be engaged with the load cells 20 via the support elements 22. Moreover, the container 3 can be said to be directly engaged with the support elements 22. As employed herein, the expression "direct engagement" and variations thereof shall refer broadly to a relationship in which an engagement between two elements includes physical contact or touching of the two elements.

As can further be understood from FIGS. 3 and 4, the movable platform 12 includes an elongated pair of parallel and spaced apart pivotable frame elements 40 that are depicted in FIGS. 3 and 4 as being disposed atop the vehicle frame 9. It can further be seen from FIG. 4 that a space indicated at the numeral 42 exists between the pivotable frame elements 40 of the movable platform 12 and the transverse frame elements 36 of the container 3. It thus can be understood from FIGS. 3 and 4 that the container 3 is depicted therein as being situated upon the weighing devices 18 rather than being situated upon the movable platform 12. In this regard, it is expressly noted that in loading the container 3 onto the roll-off truck 2 as indicated above, the container 3 is pulled with the cable 14 onto the movable platform 12 in its inclined position, in which situation the container 3 is situated on the movable platform 12, with the movable platform 12 being received in the channel 6. However, as the movable platform 12 is pivoted toward its horizontal position, the container 3 reaches a point at which the container frame 34 is received on and carried by the support elements 22 of the weighing devices 18 prior to the movable platform 12 becoming fully engaged with the vehicle frame 9. At such point, therefore, the container 3 can be said to be transferred from the movable platform 12 to the weighing devices 18. After such point, the movable platform 12 typically is fully lowered into engagement with the vehicle frame 9 to result in the arrangement depicted generally in FIGS. 3 and 4 in which the container 3 is situated resting upon the support elements 22 of the weighing devices 18 and is disengaged from the movable platform 12.

Since the container 3 is engaged with the load cells 20, the load cells 20 provide output in the form of signals which are indicative of a combined weight, i.e., mass, of the container 3 plus the materials carried within the receptacle 4 of the container 3. Depending upon the makeup of the load cells 20, such signals may be in the form of a voltage change, a resistance change, or the like, without limitation, which are received by the processor apparatus 24 of the control apparatus 19. As suggested above, however, the various load cells 20 may provide other types of output that are recorded or otherwise input into control apparatus 19.

As can be understood from FIG. 4, the thickness of the plate 22 as measured in the vertical direction from the perspective of FIG. 4 is greater than the space 42 measured in the vertical distance between the pivotable frame elements 40 of the movable platform 12 and the transverse frame elements 38 of the container 3. It thus can also be understood that if the plates 22, i.e., the support elements, were removed, the transverse frame elements 38 of the container 3 would become engaged with the pivotable frame elements 40 of the movable platform 12. That is, the container 3 would be directly engaged with the movable platform 12 rather than being engaged with the load cells 20. This is the scenario depicted generally in FIG. 7.

Figure 7:
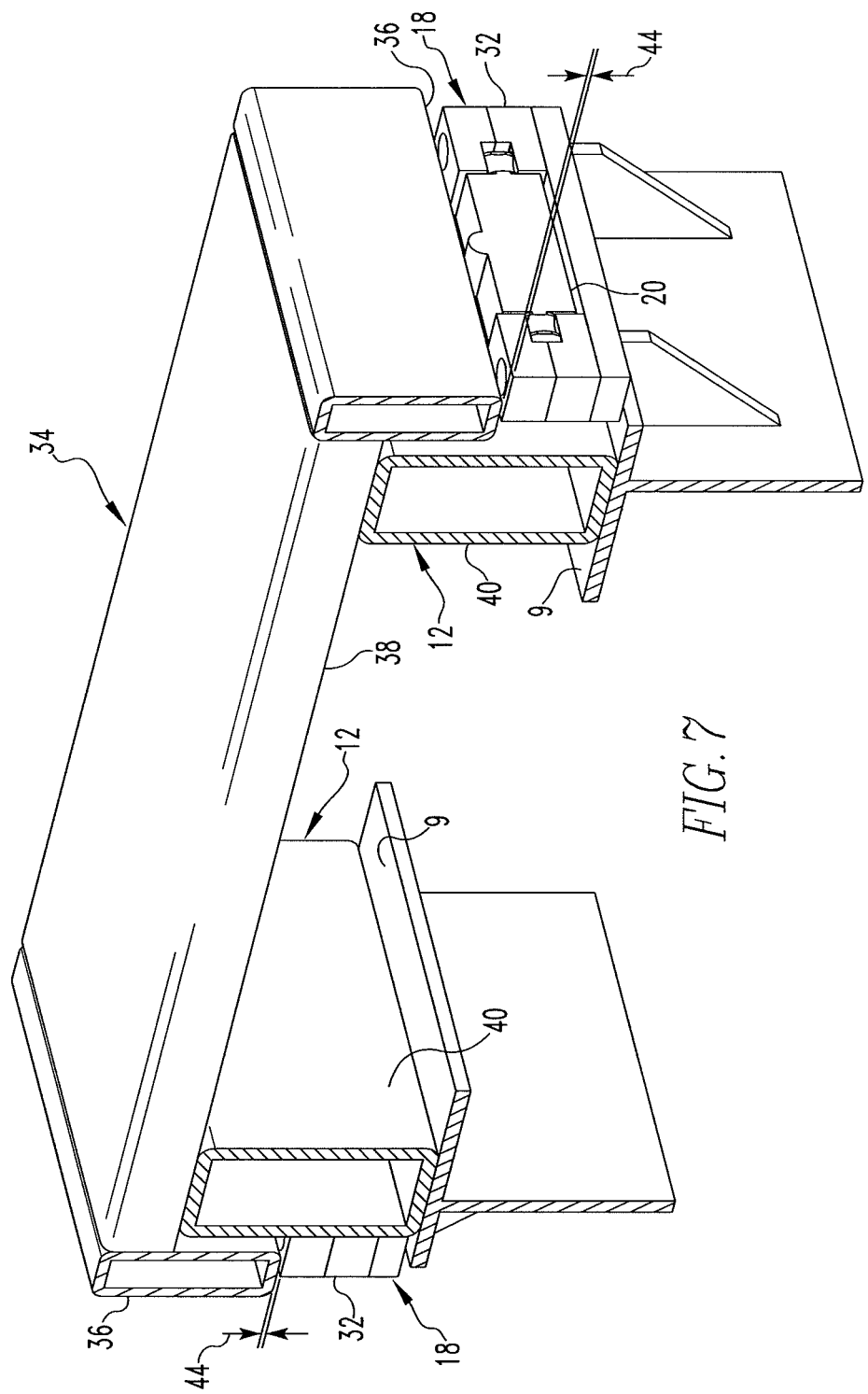
FIG. 7 is a sectional view as taken along line 7-7 of FIG. 6.

More particularly, and as can be understood from FIGS. 4 and 7, the support elements, i.e., the plates 22 in the first embodiment, are movable between a first position indicated generally in FIG. 4 and a second position indicated generally (i.e., by their absence) in FIG. 7. In the first position, the plates 22 are situated atop the load cells 20. In the second position, as is indicated generally in FIG. 7, the plates 22 have been removed from being atop the load cells 20 and may be, for instance, on the ground, in the pocket of the truck operator, or may be otherwise situated anywhere but atop the load cells 20. Moreover, movement of the support elements, i.e., the plates 22, between the first and second positions causes the load cells 20 to be changed between a first condition, such as is indicated generally in FIG. 4, and a second condition, such as is indicated generally in FIG. 7. In the first condition of the load cells 20, the plates 22 are situated atop the load cells 20. The container 3 can be engaged with the plates 22 and the load cells 20 by being lowered into engaged therewith through the use of the movable platform 12. In the second condition, as is indicated generally in FIG. 7, the load cells 20 are disengaged from the container 3, even if the container 3 is situated on the roll-off truck 2. In this regard, it is noted that FIG. 7 depicts another space 44 between the load cells 20 and the side frame elements 36, which indicates that in the second condition the container 3 is disengaged from the load cells 20 and is depicted in FIG. 7 as instead being situated atop the movable platform 12.

It is understood that various methodologies can be employed in changing the weighing devices 18 between the first and second conditions. In a first embodiment of such a methodology in accordance with the disclosed and claimed concept, the loading apparatus 10 is employed to disengage the container 3 from the weighing devices 18, after which the plates 22 are manually removed from being atop the load cells 20. More particularly, and after the outputs from the load cells 20 have been recorded by the processor apparatus 24, the hydraulic lift cylinder 16 is expanded to pivot the movable platform 12 and to cause the movable platform 12 to be pivoted toward its inclined position. Once the movable platform 12 has been pivoted sufficiently to cause the container 3 to become disengaged from the plates 22 and the load cells 20, which is the scenario depicted generally in FIG. 5, an operator can manually remove the plates 22 from atop the load cells 20. Such removal of the plates 22 changes the weighing devices 18 from their first condition to their second condition. While in the embodiment depicted generally in FIGS. 1-7 the plates 22 are merely laid atop the load cells 20 in the first condition of the weighing devices 18, the plates 22 in other embodiments potentially could additionally include guide structures or other retention structures that, for instance, potentially could resist the plates 22 from falling off of the load cells 20 due to vibration, and the like during pivoting of the movable platform 12 towards its horizontal position.

Figure 5:
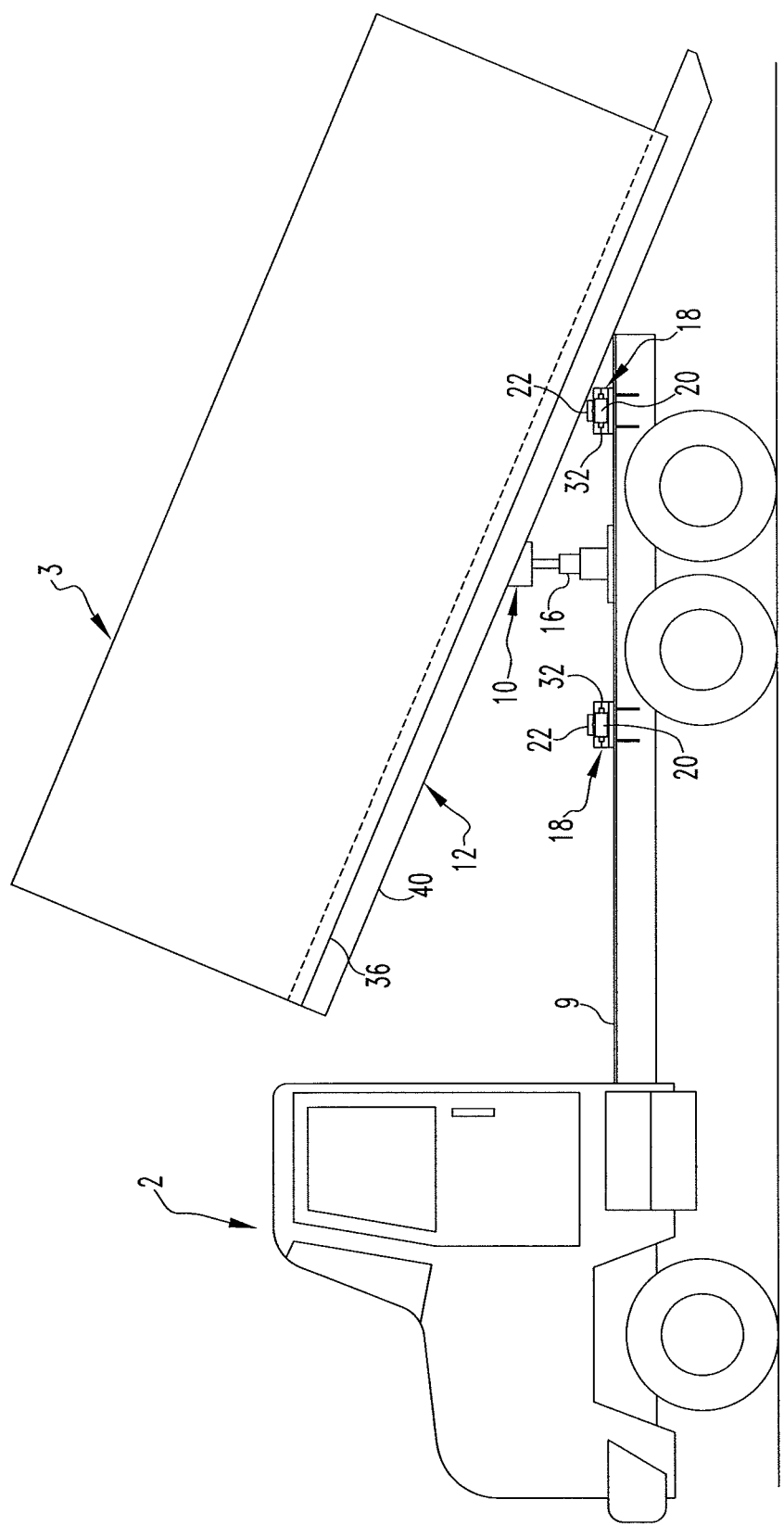
FIG. 5 is a diagrammatic depiction of the container disposed on a movable platform of the roll-off truck after the container has been removed from engagement with the weighing devices by pivoting the movable platform with respect to a vehicle frame of the roll-off truck.
Figure 6:
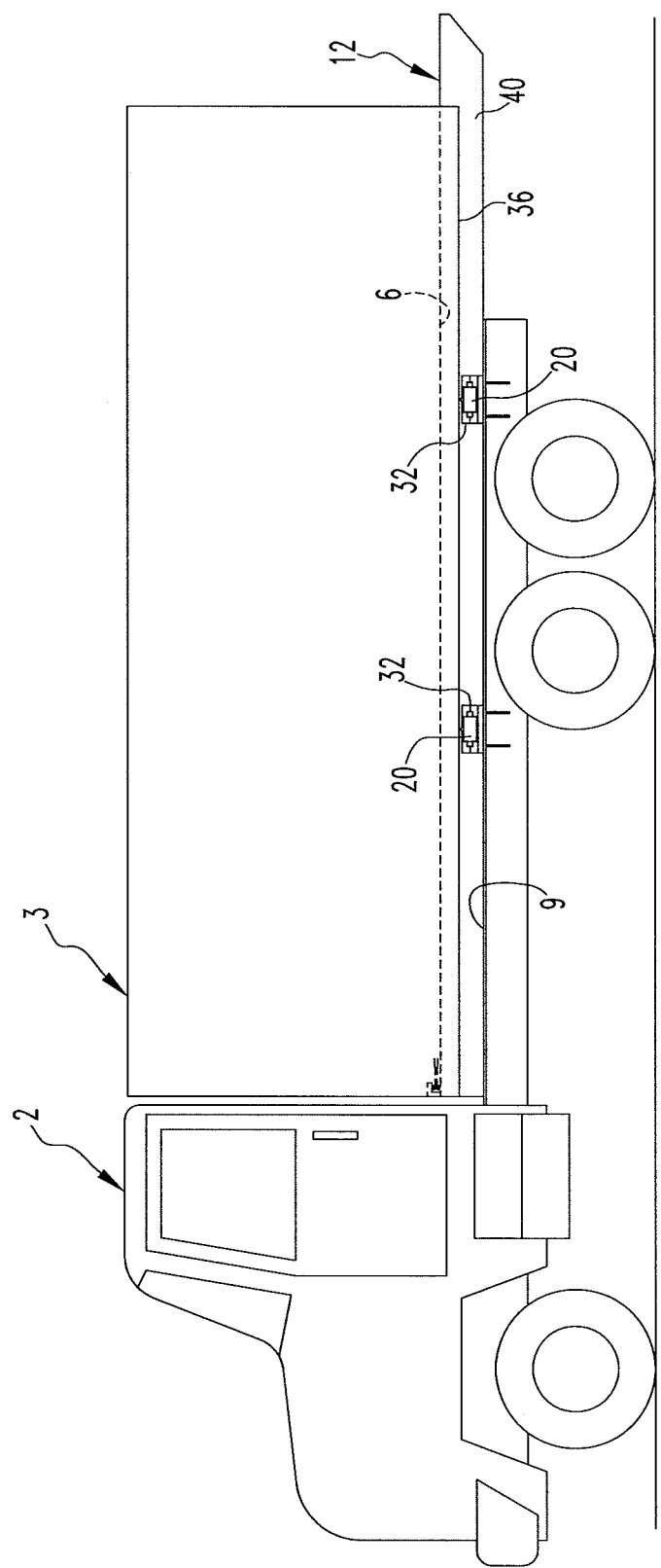
FIG. 6 is a diagrammatic depiction of the container engaged with a platform apparatus of the roll-off truck and disengaged from the number of weighing devices after the movable platform has been pivoted back toward the vehicle frame.

Once the loading apparatus 10 has pivoted the container 3 sufficiently to disengage it from the weighing devices 18, as is indicated generally in FIG. 5, and the plates 22 removed from atop the load cells 20, the hydraulic lift cylinder can be collapsed to cause the movable platform 12 to again pivot toward the horizontal position, as is indicated in FIG. 6, wherein the movable platform 12 is again pivoted, i.e., lowered, into engagement with the vehicle frame 9, as is indicated in FIGS. 6 and 7. However, since the plates 22 have been removed from atop the load cells 20, the container 3 remains engaged with the movable platform 12 without engaging the load cells 20. That is, the transverse frame elements 38 rest atop the pivotable frame elements 40 rather than the side frame elements 36 being engaging with the load cells 20. In such condition, i.e., the roll-off truck 2 with the container 3 loaded thereon and with the weighing devices 18 in their second condition, the roll-off truck 2 can be driven on the roadway to transport the container 3 from one location to a different location, such as for dumping, without the container 3 engaging the load cells 20.

In this regard, it is understood that the load cells 20 are of sufficient sensitivity and accuracy that they are considered to be "legal for trade", which provides certain benefits with regard to the accuracy of the outputs from the load cells 20. While the load cells 20 are configured to withstand the weight of the container 3 plus its contents and to provide output signals indicative of the combined weight of the container 3 and its contents while the roll-off truck 2 is stationary, such load cells 20 would likely be subject to damage if the container 3 remained engaged with the load cells 20 while being transported over the roadway, such as when the container 3 is transported to a different location for dumping. Desirably, therefore, the removal of the plates 22 to cause the weighing devices 18 to be changed from their first condition and their second condition results in the container 3 being mounted on the roll-off truck 2 and, more particularly, to its movable platform 12 of its platform apparatus 8. In such a configuration, the container 3 and the load cells 20 are disengaged from one another, thereby avoiding potential damage to the load cells 20.

Advantageously, the weighing apparatus 1 employs the loading apparatus 10 of the roll-off truck 2 to enable the plates 22 to be removed from the load cells 20, which avoids the need to provide the weighing apparatus 1 with separate lifting structures in addition to the loading apparatus 10 to disengage the container 3 from the weighing devices 18. With the container situated as indicated in FIG. 3 and the load cells 20 outputting signals that are indicative of the weight of the container 3 plus any materials contained therein, the movable platform 12 can be rapidly pivoted away from the vehicle frame 9 to disengage the container 3 from the plates 22 and to enable the plates 22 to be manually removed by the operator. After such removal, the movable platform 12 can be rapidly pivoted again into engagement with the vehicle frame 9, at which point the container 3 is fully loaded on the roll-off truck 2 without being engaged with the load cells 20. The transition between the condition of FIG. 3 and the condition of FIG. 7 can be performed by a skilled operator in only one or two minutes or less, thus saving time.

With the container 3 installed on the roll-off truck 2 as indicated in FIGS. 6 and 7, the roll-off truck 2 can be driven with the container 3 and its materials contained therein to another site, such as for dumping. The container 3 is dumped in the usual fashion, such as by opening a door at the trailing edge of the container 3, i.e., at the right of FIG. 6, and by expanding the hydraulic lift cylinder 16 to pivot the container 3 away from the vehicle frame 9 and to cause its contents to be discharged from the receptacle 4 of the container 3. Other known dumping methodologies may be employed without departing from the present concept. After such dumping has been completed, the door at the trailing edge of the container is closed (if it was opened beforehand), and the container is situated on the movable platform 12, with the movable platform 12 being inclined above the vehicle frame 9. In such position, the movable platform 12 and the container 3 can be said to be disengaged from the vehicle frame 9.

In such a situation, the weighing devices 18 typically will still be in their second condition. However, prior to lowering of the movable platform 12 and the container 3 back onto the vehicle frame 9, the operator can return the plates 22 to being atop the load cells 20 and can then lower the movable platform 12 into engagement with the vehicle frame 9. In such a scenario, as is indicated generally in FIG. 3, the container 3 will again be engaged with the plates 22 and with the load cells 20, and the load cells 20 can again output a signal that is indicative of the weight situated thereon. However, the weight situated on the load cells 20 in this second instance of the first condition of the weighing devices 18 is reflective of the container 3 without the contents that had just been dumped from its receptacle 4. Once such signals have been received by the processor apparatus 24, the processor apparatus 24 can subtract this second set of signals (i.e., indicative of the weight of the container 3 without the material) from the initial set of signals (i.e., indicative of the weight of the container 3 plus the materials) in order to determine the net weight of the materials that were dumped from the container 3. The operator can then again expand the hydraulic lift cylinder 16 to pivot the movable platform 12 and the container 3 away from the support elements 22 and can again remove the support elements 22. Afterward, the hydraulic lift cylinder 16 is collapsed to return the container 3 (empty of its contents) to its horizontal position where it remains engaged with the movable platform 12 and where the movable platform 12 becomes engaged with the vehicle frame 9, and without the container 3 being engaged with the load cells 20. The roll-off truck 2 can then be driven on the roadway to return the container 3 to the original location, or the empty container can be transported to a different location.

Figure 8A:
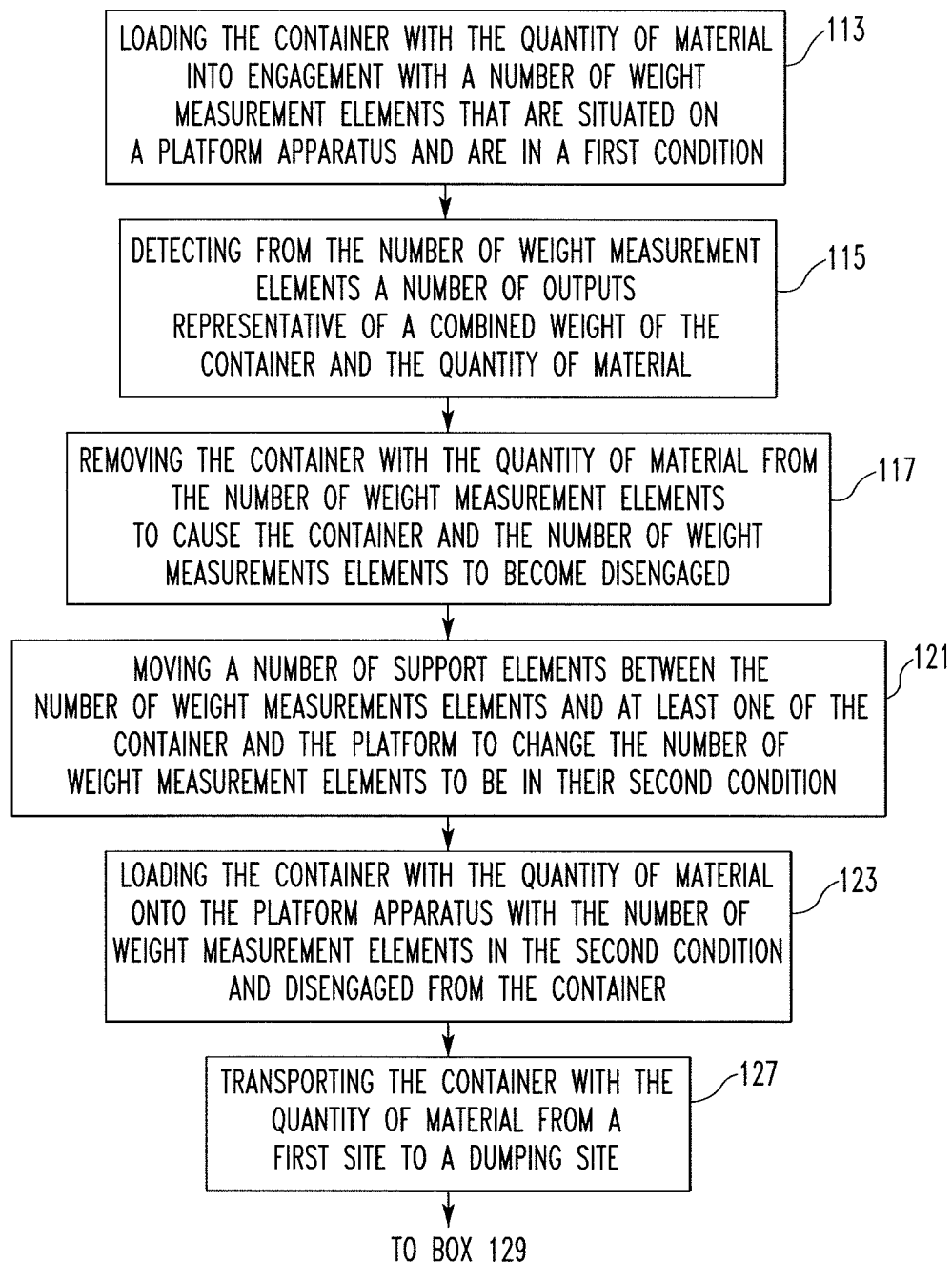
FIGS. 8A and 8B depict a flowchart illustrating certain aspects of an embodiment of an improved method in accordance with the disclosed and claimed concept.

A first embodiment of an improved method in accordance with the disclosed and claimed concept is indicated generally in FIG. 8. The operation can be said to begin, as at 113, with using the roll-off truck's own loading apparatus 10 to load the container 3 with the quantity of material into engagement with the weight measurement elements 18 that are situated on the platform apparatus 8 of the roll-off truck 2. In this regard, the weight measurement elements, i.e., the load cells 20, can be situated on either the vehicle frame 9 or the movable platform 12, it being noted that in the embodiment depicted generally in FIGS. 1-7 the load cells 20 are mounted to the vehicle frame 9.

In such a situation, the roll-off truck 2 and the container 3 are in the positions indicated generally in FIG. 3. Processing then continues, as at 115, where a number of outputs are detected from the load cells 20 and are received by the processor apparatus 24. The output signals are representative of a combined weight of the container 3 and the quantity of materials contained within the receptacle 4 of the container 3.

Processing then continues, as at 117, where the container 3 is removed from the number of load cells 20 to cause the container 3 and the load cells 20 to become disengaged. This is the situation indicated generally in FIG. 5, although the extent to which the movable platform 12 must be pivoted typically will be based upon the configuration of the weight measurement elements 18, i.e., the movable platform 12 is pivoted until the container and the load cells 20 are disengaged. The plates 22 can then be removed from being situated atop the load cells 20 as is indicated at 121, to change the load cells 20 from being in their first condition to being in their second condition.

The loading apparatus 10 can then be operated to cause the movable platform 12, upon which the container 3 with the quantity of material contained therein is situated, to be pivoted to the horizontal position and onto the vehicle frame 9. In such a situation, the weighing devices 18 and the load cells 20 are in their second condition, and the container 3 is engaged with the movable platform 12 rather than being engaged with the load cells 20, as at 123. The roll-off truck 2 can then be driven with the container 3 mounted thereon from a first site to a second site such as a dumping site, as is indicated at 127. At the second site, the container 3 can be moved away from at least a portion of the platform apparatus 8, as at 129, and the quantity of material can be dumped from the receptacle 4 of the container 3, as is indicated at 131.

The operator can then, as at 133, reposition the plates 22 atop the load cells 20, at which point the load cells 20 will be in their first condition. The container 3 without its quantity of material can then be lowered into engagement with the weighing devices 18 in their first condition, as is indicated at 135, using the loading apparatus 10 of the roll-off truck 2. Such a condition is depicted generally in FIG. 3, albeit without the container 3 having the quantity of materials contained therein. A number of output signals can then be detected, as at 137, from the load cells 20 that are representative of the weight of the container 3 without the quantity of material. The weight represented by the signals detected as at 137 can then be subtracted from the weight represented by the signals detected at 115 to determine a net weight of the quantity of material that was contained in the container 3, as at 139. In this regard, the "subtracting" does not necessarily refer to the subtracting of one signal from another, but rather is intended to refer to the subtraction of a weight of the container by itself as ascertained from the signals obtained at 137 from the weight of the container plus the quantity of materials as ascertained from the signals detected at 115.

As can be seen from FIGS. 3 and 6, the weighing devices 18 are positioned on the platform apparatus 8 in an arrangement generally equally spaced about what could be referred to as the centroid of mass of the container 3 when the container 3 is loaded thereon. This is desirable in order that the load cells 20 do not need to be of a weight capacity that would be much greater than if the load cells were equally distributed. It is noted, however, that the load cells 20 may be positioned at other locations on the platform apparatus 8 based upon the needs of the configuration without departing from the present concept.

Moreover, while the exemplary embodiment depicted herein includes four of the weighing devices 18, it is noted that a larger or smaller quantity of the weighing devices 18 could be employed without departing from the present concept. For instance, six or eight such weighing devices 18 could be employed or, alternatively, as few as one or two could be employed depending upon the geometry of the particular application.

An alternative improved weighing device 118 that can be employed in an improved weighing apparatus in accordance with a second embodiment of the disclosed and claimed concept is indicated generally in FIGS. 9 and 10. That is, the weighing device 118 can be implemented into the weighing apparatus 1 or the roll-off truck 2 or both in place of the weighing device 18, with the result being a second embodiment of the weighing apparatus and the roll-off truck. For purposes of simplicity of disclosure, the complete second embodiment of the weighing apparatus employing the weighing device 118 is not depicted herein, it being understood that the second embodiment would appear very much like the weighing apparatus 1 depicted in FIG. 2, except employing the weighing device 118 in place of the weighing device 18.

The weighing device 118 includes a load cell 120 situated on a bracket 132 that is mounted on the platform apparatus 8 of the roll-off truck 2. The weighing device 118 further includes a support element in the form of a plate 122 that is situated underneath the load cell 120, i.e., between at least a portion of the load cell 120 and at least a portion of the bracket 132 in the depicted example. When the plate 122 is situated underneath the load cell 120, as is indicated in FIG. 9, the plate 122 is in the first position, and the weighing device 118 is in the first condition. The container frame 34 is thus engageable with the load cell 120 in such a situation, as is indicated generally in FIG. 9. However, when the plate 122 is removed from engagement with the load cell 120, the load cell 120 is movable downward to remove it from engagement with container frame 34. Such a situation is indicated generally in FIG. 10 and depicts the second condition of the weighing device 118.

While the load cell 120 and the bracket 132 are depicted as being mounted to the vehicle frame 9, it is noted that portions of the weight measurement element 118 can be mounted to the vehicle frame 9, the movable platform 12, or both without departing from the present concept. The same can be said for the weight measurement element 18 described above and the other weight measurement elements described below. For example, the bracket 132 and the load cell 120 could be disposed on the movable platform 12, and the plate 122 could be removably situated on the vehicle frame 9. In such a configuration, when the movable platform 12 is lowered onto the vehicle frame 9 with the plate 122 situated thereon, the plate 122 would move the load cell 120 upward and into engagement with the container 3. When the plate 122 are removed, the load cell 120 would move downward and out of engagement with the container 3. Other variations can be envisioned.

Figure 11:
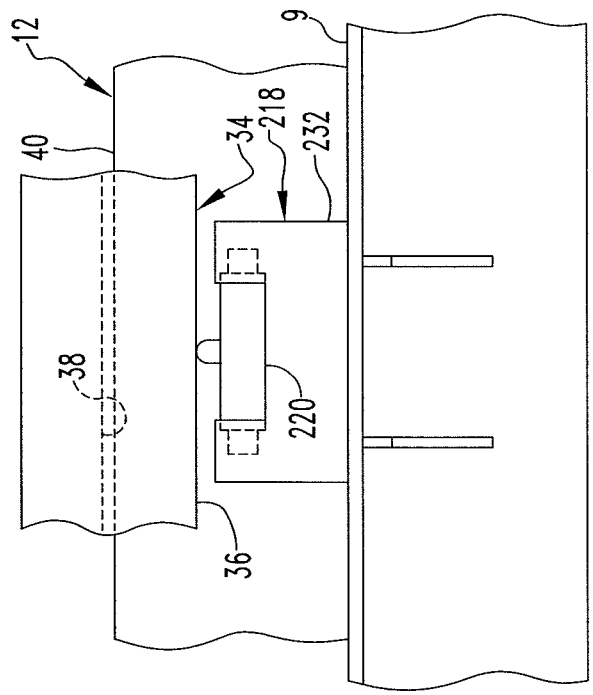
FIG. 11 is a diagrammatic depiction of an improved weighing device that can be used in a third embodiment of the weighing apparatus, with the weighing device being in a first condition.
Figure 12:
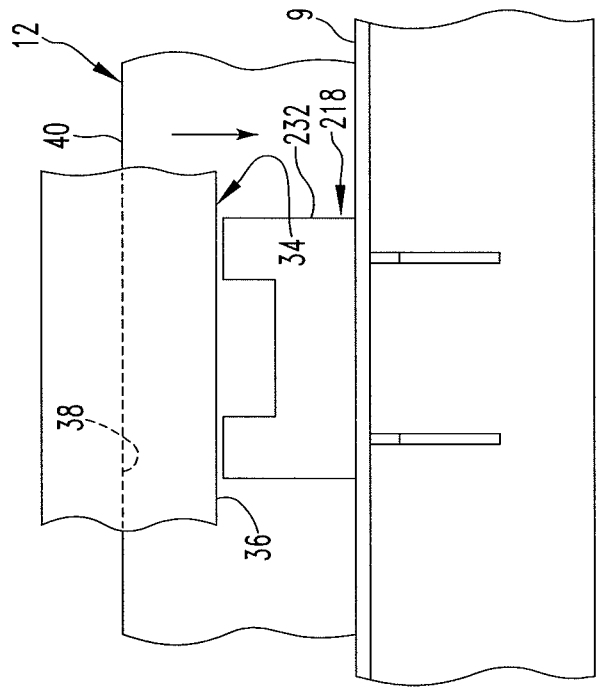
FIG. 12 is a view similar to FIG. 11, except depicting the weighing device in a second condition.

Another alternative improved weighing device 218 that can be used in an alternative weighing apparatus in accordance with a third embodiment of the disclosed and claimed concept is indicated generally in FIGS. 11 and 12. The weighing device 218 includes a weight measurement element 220 that is removably situated on a bracket 232 in the first condition of the weighing device 218. The weight measurement element, i.e., load cell 220, can be removed from the bracket 232 when the container 3 has been removed from engagement with the load cell 220, thereby placing the weighing device 218 in the second condition. The container 3 and the movable platform 12 can then be lowered into engagement with the vehicle frame 9. In such a second condition, the container frame 34 and the container 3 are disengaged from the weighing device 218, as is indicated generally in FIG. 12.

Figure 14:
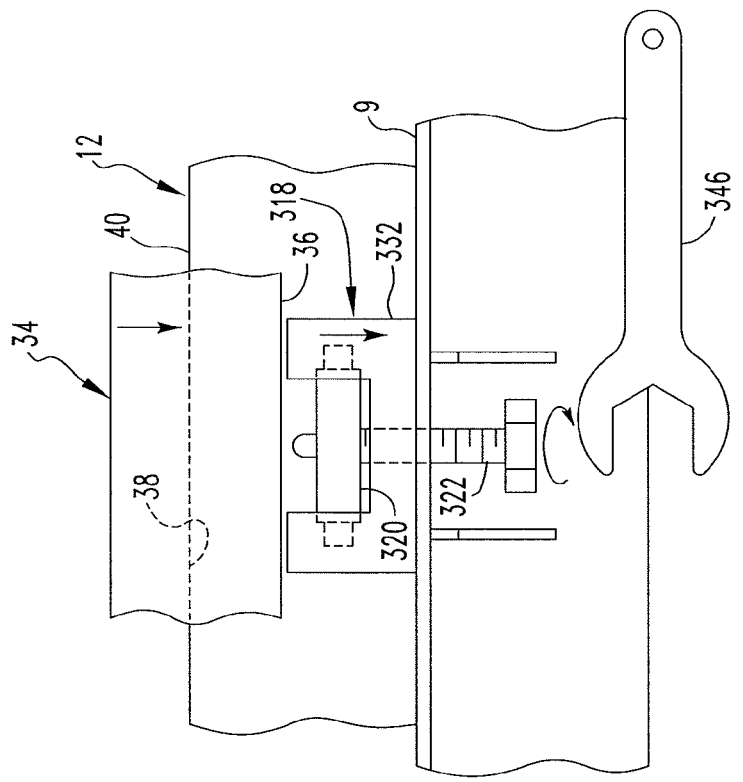
FIG. 14 is a view similar to FIG. 13, except depicting the weighing device in a second condition.
Figure 13:
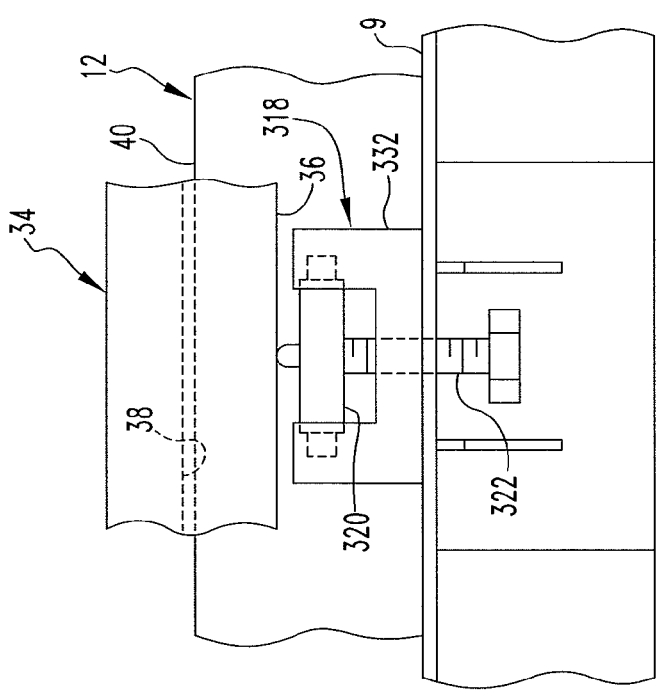
FIG. 13 is a diagrammatic depiction of an improved weighing device that can be used in a fourth embodiment of the weighing apparatus, with the weighing device being in a first condition.

Another alternative improved weighing device 318 that can be employed in conjunction with an improved weighing apparatus in accordance with a fourth embodiment of the disclosed and claimed concept is depicted generally in FIGS. 13 and 14. The weighing device 318 includes a weight measurement element in the form of a load cell 320 and a support element that is in the form of a helical threaded element 322 such as a bolt that supports the weight measurement element 320 in variable positions with respect to a bracket 332. A tool 346 is employable to rotate the helical threaded element 322 whereby the load cell 320 is translated in the vertical direction with respect to FIGS. 13 and 14.

The helical threaded element 322 can be referred to as a retention element due to its retention of the load cell 320 in a first configuration of the bolt, as is indicated in FIG. 13, and due to its releasing of the load cell 320 for potential downward movement thereof, for instance, when the bolt is in a second configuration, as is indicated in FIG. 14. Other types of retention elements can be envisioned, such as crank elements, over-centering elements, and the like without limitation.

In the exemplary embodiment depicted in FIGS. 13 and 14, the exemplary helical threaded element 322 is threadably cooperable with the bracket 332, and rotation of the helical threaded element 322 causes it and thus the load cell 320 to be advanced in the vertical direction with respect to FIGS. 13 and 14. In FIG. 13, the container frame 34 is engaged with the load cell 320, but in FIG. 14 the tool 346 has been used to rotate the helical thread element 322 to cause the weighing device 318 to be changed from the first condition with the load cell being engaged with the container 3 to the second condition with the load cell 320 and the container 3 being disengaged.

It is to be understood that the helical thread element 322 can be considered to be an inclined element, such as in the nature of a wedge or ramp, albeit one that is advanced through rotation of the helical thread element 322 rather than direct translation thereof. That is, the helical threads formed on the helical thread element 322 are inclined at an oblique angle with respect to the direction of elongation of the helical thread element 322. The angle of such threads serves to incline the threads with respect to the direction of elongation of the helical thread element 322, whereby rotation of the helical thread element 322 results in a gradual translation or advancement of the helical thread element 322. The helical threaded element 322 can also be referred to as a pivot element or a pivot apparatus because pivoting thereof changes the weighing device 318 between its first and second conditions.

Figure 15:
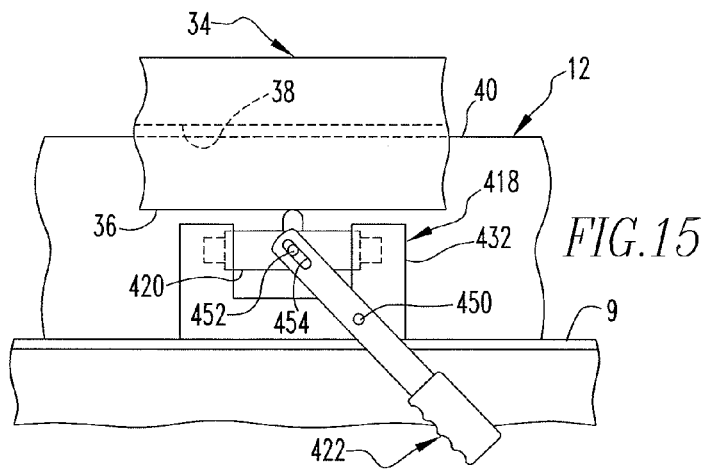
FIG. 15 is a diagrammatic depiction of an improved weighing device that can be used in a fifth embodiment of the weighing apparatus, with the weighing device being in a first condition.
Figure 16:
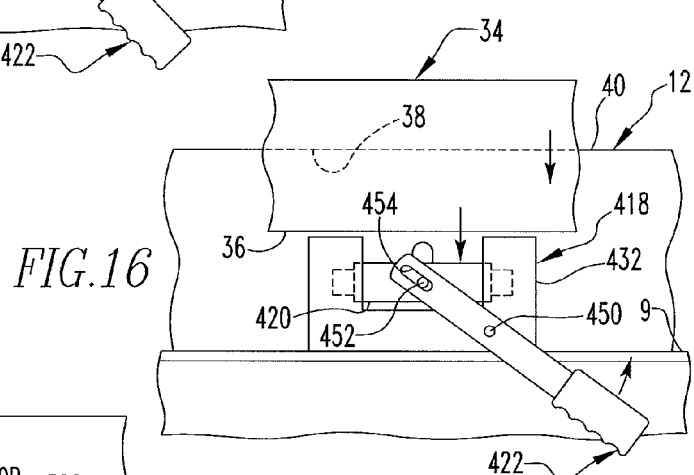
FIG. 16 is a view similar to FIG. 15, except depicting the weighing device in a second condition.

Another alternative improved weighing device 418 that can be employed in a weighing apparatus in accordance with a fifth embodiment of the disclosed and claimed concept is depicted generally in FIGS. 15 and 16. The weighing device 418 includes a weight measurement element in the form of a load cell 420 and includes a support element in the form of a lever 422. The weighing device 418 further includes a bracket 432 having a fulcrum pin 450 about which the lever 422 pivots. The lever 422 further cooperates with a reaction pin 452 that is depicted in FIGS. 15 and 16 as being mounted to the load cell 420 and being movably situated within an elongated slot 454 formed on the lever 422.

In one position of the lever 422, the load cell 420 is in the first condition and is engaged with the container frame 34, as is depicted generally in FIG. 15. As the lever 422 is pivoted toward another position, as is indicated generally in FIG. 16, the load cell 420 is translated in the vertical direction with respect to FIGS. 15 and 16 and is disengaged from the container 3 to place the load cell in its second condition.

It is noted that the positions of the fulcrum pin 450 and the reaction pin 452 are merely exemplary and could be otherwise positioned and could be connected to other structures without departing from the present concept. For example, and without limitation, the reaction pint 452 potentially could be connected with another support structure that carries the load cell 420 rather than being connected directly to the load cell 420.

It is also noted that the weighing device 418 may include locking or latching structures that are not expressly depicted herein. For instance, it may be desirable to retain the lever 422 in either the first position of FIG. 15 or the second position of FIG. 16, or both.

Figure 17:
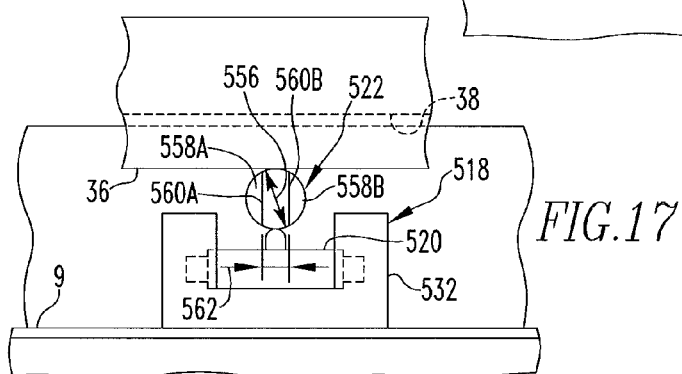
FIG. 17 is a diagrammatic depiction of an improved weighing device that can be used in a sixth embodiment of the weighing apparatus, with the weighing device being in a first condition.
Figure 18:
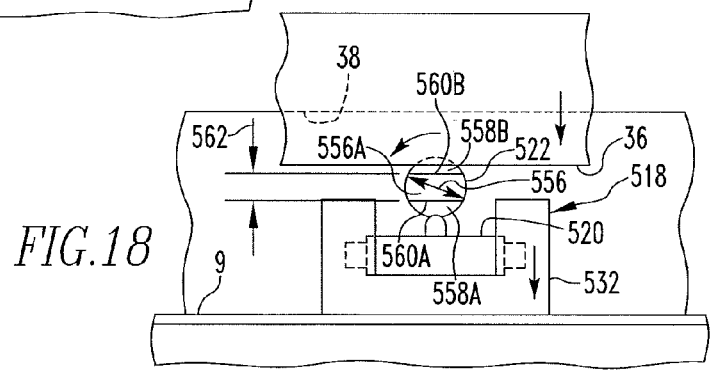
FIG. 18 is a view similar to FIG. 17, except depicting the weighing device in a second condition.

Another alternative improved weighing device 518 that can be employed in a weighing apparatus in accordance with a sixth embodiment of the disclosed and claimed concept is depicted generally in FIGS. 17 and 18. The weighing device 518 includes a weight measurement element in the form of a load cell 520 and also includes a support element in the form of a rod 522 that will be described in greater detail below. The weighing device 518 further includes a bracket 532 upon which the load cell 520 is situated.

As can be understood from FIGS. 17 and 18, the exemplary rod 522 is of a nominally circular cross-section having a nominal diameter 556. It is understood that the rod 522 is elongated in a direction into the plane of the page of FIGS. 17 and 18. The rod 522 also has a pair of indentations 558A and 558B formed thereon that result in the formation of a pair of parallel and spaced apart flats 560A and 560B, i.e., flat surfaces that are of a generally planar configuration. The flats 560A and 560B are spaced apart by a transverse diameter 562 that is significantly less than the nominal diameter 556. In the depicted embodiment in FIGS. 17 and 18, the transverse diameter 562 is only about one third of the nominal diameter 556. The indentations 558A and 558B can be formed in any of a variety of fashions such as by cutting, pressing, and the like. Moreover, the rod 552 can simply be formed, such as by casting or other formation methodology, to have the indentations situated thereon.

As can be understood from FIGS. 17 and 18, the rod 522 is in the form of a pivot element or a pivot apparatus that pivots between a first position, such as is indicated generally in FIG. 17, and a second position, such as is indicated generally in FIG. 18. More particularly, when the rod 522 is in the first position, as in FIG. 17, the indentations 558A and 558B are rotated away from the container frame 34 and the load cell 520, meaning that neither the load cell 520 nor the container frame 34 are received in either of the indentations 558A and 558B. In such a condition, the container frame 34 and the load cell 520 are each engaged with the cylindrical outer surface of the rod 522 and thus are separated from one another by the nominal diameter 556, which results in the container 3 being engaged with the load cell 520 via the rod 522. However, when the rod 522 is rotated to its second position, the indentation 558A is aligned with the load cell 520, and the indentation 558B is aligned with the container frame 34, thus enabling the load cell 520 to be at least partially received in the indentation 558A or the container frame 34 to be at least partially received in the indentation 558B or both. In such a condition, the container frame 34 moves vertically downward from the perspective of FIG. 18, and it is understood that the container 3 engages the movable platform 12 while becoming disengaged from the load cell 520.

While the rod 522 is depicted as including a pair of flats 562A and 562B, it is understood that in other embodiments the rod could function with only a single flat and, depending upon the configuration, could function with only a single indentation that did not necessarily result in a flat surface, i.e., such as if the indentation were of an arcuate cross section, by way of example.

It is also understood that the rod 522 potentially can be sufficiently elongated to extend between a pair of the weighing devices 518 situated on opposite sides of the roll-off truck 2. Such an elongated rod would be formed to include two sets of the indentations 558A and 558B and two sets of flats 560A and 560B situated at opposite ends of the rod. It is furthermore understood that such an elongated rod could likewise be made to function with only a single indentation at each end cooperating with each of the two weighing devices 518 at opposite sides of the roll-off truck 2.

While no particular mechanism is depicted in FIGS. 17 and 18 for pivoting the rod 522 between the two rotational positions, it is understood that any of a variety of structures and methodologies may be employed. For instance, a tool could be employed by an operator to pivot the rod 522. Alternatively, a lug could extend radially outwardly from the rod 522 and could be connected with a helical threaded element which, when rotated, would pivot the crank and thus the rod 522 between the two positions depicted generally in FIGS. 17 and 18. Other embodiments of a pivot apparatus that includes the rod 522 can be envisioned within the scope of the present concept.

Another alternative improved weighing device 618 that can be employed in an improved weighing apparatus in accordance with a seventh embodiment of the disclosed and claimed concept is depicted generally in FIGS. 19-22. The weighing device 618 includes a weight measurement element in the form of a load cell 620, a support in the form of a rotatable pivot apparatus 622, and a bracket 632. The pivot apparatus 622 pivots about an axis of rotation 664 and includes an eccentric element 668, an engagement element 670, and a connection element 672 connected together along the axis of rotation 664. The eccentric element 668 has a radius that varies with circumferential position.

The pivot apparatus 622 is disposed on the bracket 632 and is engageable with the container frame 34. The engagement element 670 is engageable with the load cell 620. The connection element 672 is structured to be connectable with a tool or other device to pivot the pivot apparatus about its axis of rotation 664.

As can be understood from FIGS. 19 and 20, when the pivot apparatus 622 is pivoted to its first position, the container 3 disposed on the roll-off truck 2 is engaged with an eccentric surface of the eccentric element 668 and thus is engaged with the pivot apparatus 622. The load of the container 3 engaged with the eccentric element 668 is transferred to the load cell 620 via the engagement element 670. (It is noted that the load cell 620 and the engagement element 670 are depicted in phantom lines in FIGS. 20 and 22 for purposes of reference.) The load cell 620 provides an output as set forth above.

Figure 22:
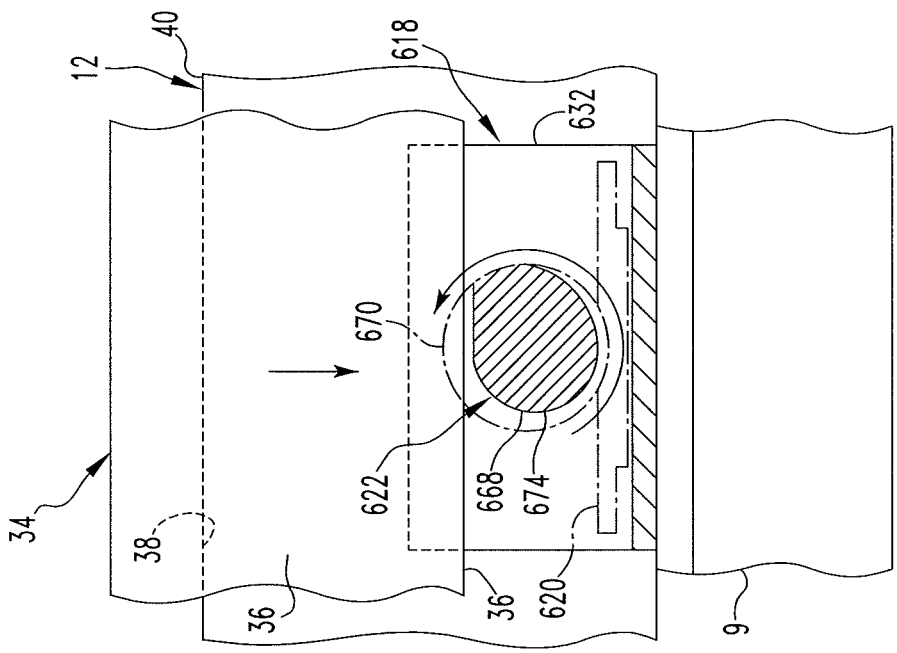
FIG. 22 is a sectional view as taken along line 22-22 of FIG. 21.
Figure 21:
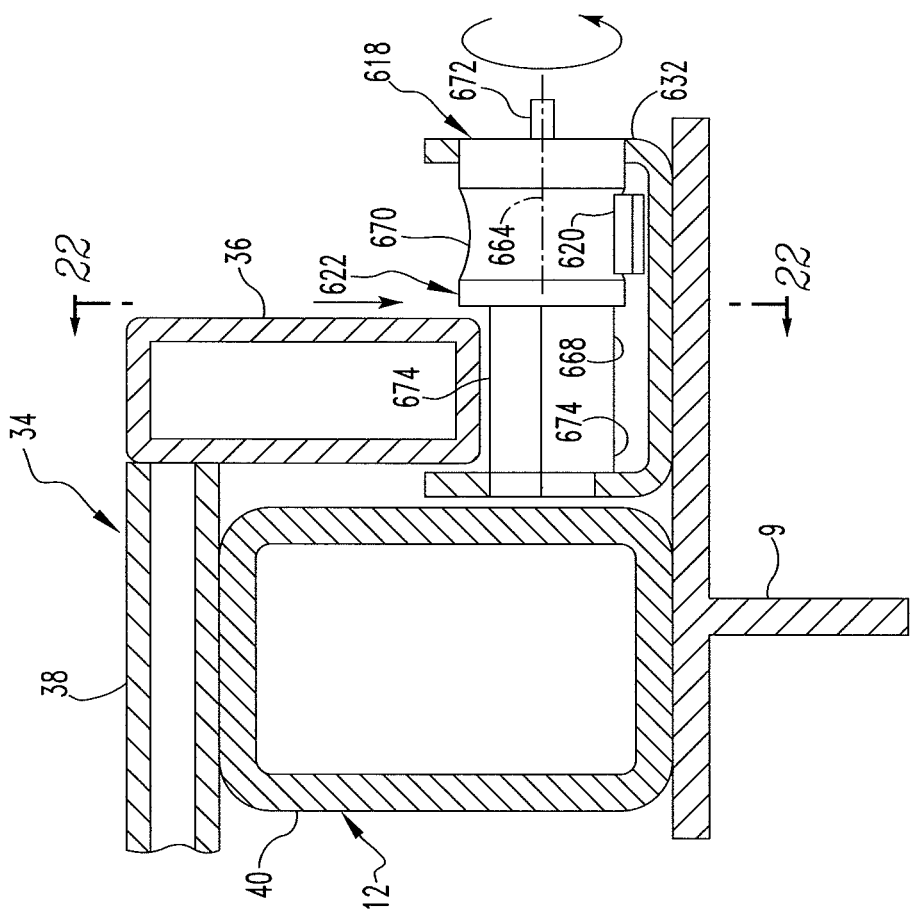
FIG. 21 is a view similar to FIG. 19, except depicting the weighing device in a second condition.

When the eccentric element 668 is pivoted to its second position as is indicated in FIGS. 21 and 22 however, the container frame 34 drops sufficiently in the vertical direction from the perspective of FIGS. 20 and 22 that the transverse frame elements 38 engage the pivotable frame elements 40. The container frame 34 thus becomes disengaged from the eccentric element 668 as can be seen from the space between the side frame element 36 and the eccentric element 668 in FIG. 21. Like the rod 522, it is possible that an elongated structure potentially can extend between a pair of the pivot apparatuses 622 on weighing devices 618 at opposite sides of the roll-off truck 2.

Another alternative improved weighing device 718 that can be employed on conjunction with a weighing apparatus in accordance with an eighth embodiment of the disclosed and claimed concept is depicted generally in FIGS. 23-27. The weighing device 718 includes a weight measurement element in the form of a load cell 720, a support element in the form of a pivot apparatus 722, and a bracket 732 that supports the load cell 720. The pivot apparatus 722 and the bracket 732, are, in the depicted exemplary embodiment, mounted to the pivotable frame elements 40 of the loading apparatus 10, although it is noted that in other embodiments either or both such structures potentially could be mounted to the vehicle frame 9 without departing from the present concept.

Figure 24:
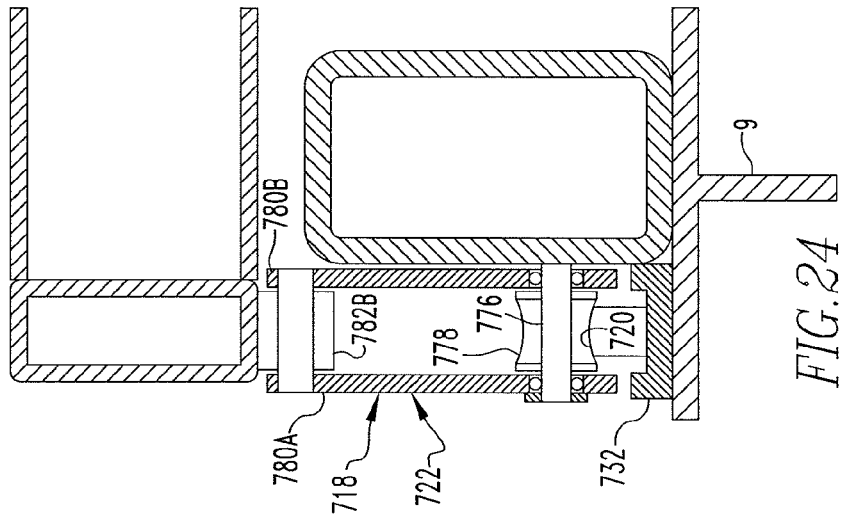
FIG. 24 is a sectional view as taken along line 24-24 of FIG. 23.
Figure 23:
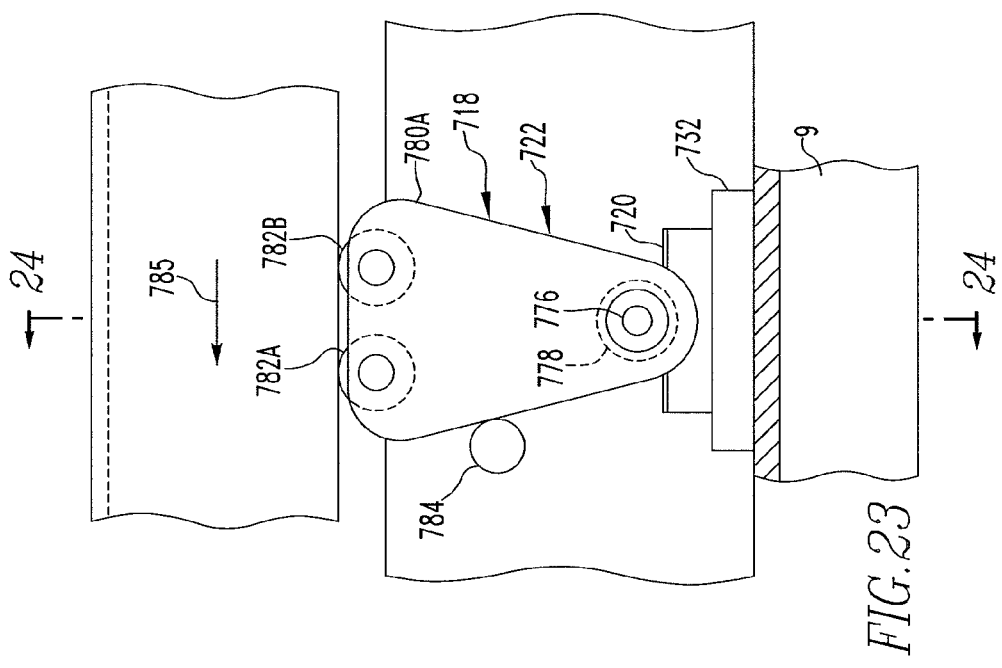
FIG. 23 is a diagrammatic view of an improved weighing device that can be used in an eighth embodiment of the weighing apparatus, with the weighing device being depicted in a first condition, and further depicting movement of the container in a first direction.

As can be understood from FIGS. 23 and 24, the pivot apparatus 722 includes a shaft 776, an engagement element 778 disposed on the shaft 776, a pair of eccentric elements 780A and 780B disposed on the shaft, and a pair of one-way rollers 782A and 782B that extend between the pair of eccentric elements 780A and 780B. The engagement element 778 also extends between the pair of eccentric elements 780A and 780B. The weighing device 718 further includes a stop 784 that is affixed to one of the pivotable frame element 40. While in the depicted exemplary embodiment the bracket 732 is fixedly mounted to the pivotable frame element 40, the shaft 776 is at least slightly movable in at least the vertical direction from the perspective of FIG. 24 with respect to the pivotable frame element 40. The eccentric elements 780A and 780B may be mounted to the shaft 776 with ball bearings, bushings, or other rotatable devices in order to permit them to be freely pivotable about the shaft 776 between the stop 784 and the bracket 732.

As can be understood from FIGS. 23 and 24, the pivot apparatus 722 can be situated in a first position in which the container frame 34 is engageable with the one-way rollers 782A and 782B, which transfer the load through the eccentric elements 780A and 780B, through the shaft 776, and through the engagement element 778 to the load cell 720, whereby the container 3 can be said to be engaged with the load cell 720. The one-way rollers 782A and 782B are configured to be rollable (with respect to the eccentric elements 780A and 780B) in a first direction, which would be the counterclockwise direction from a perspective of FIG. 23, and to resist rotation in an opposite direction, which would be clockwise from the perspective of FIG. 23. The one-way rollers 782A and 782B thus are configured to permit rolling engagement by the container frame 34 when the container 3 is moving in a first direction as is indicated generally at the arrow 785 in FIG. 23. The first direction 785 coincides with the cable 14 pulling the container 3 onto the movable platform 12, and during such operation the container frame 34 engages the one-way rollers 782A and 782B and causes them to rotate in a counter-clockwise direction while the possible rotation of the eccentric elements 780A and 780B about the shaft 776 is limited, as needed, by the stop 784. It is also noted, however, that since the pivot apparatus 722 is provided with a pair of the one-way rollers, i.e., the one-way rollers 782A and 782B, the weight of the container frame 34 on the two one-way rollers 782A and 782B has a self-centering effect that retains the pivot apparatus 722 in a fixed position as the container 34 rolls in the first direction 785.

Figure 25:
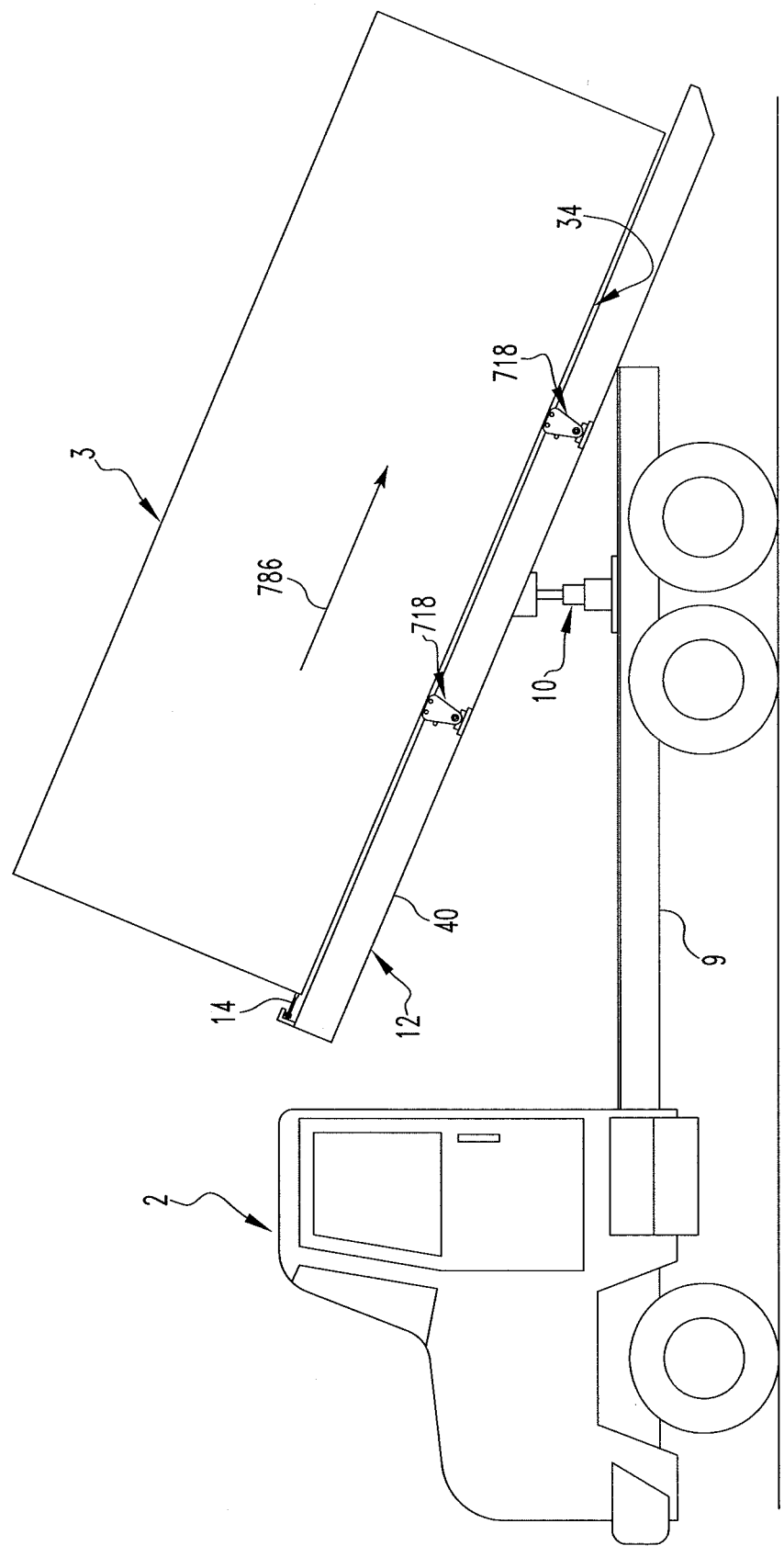
FIG. 25 is a diagrammatic view of the roll-off truck employing the weighing device of FIG. 23, with the container being moved in a second direction.
Figure 26:
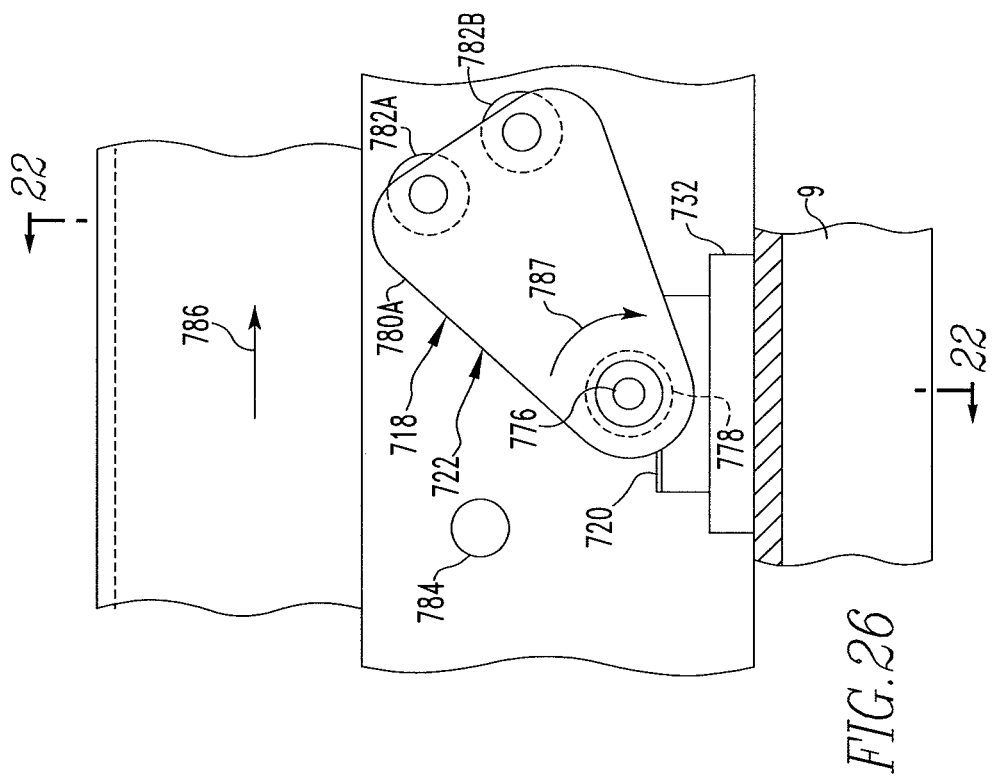
FIG. 26 is a view similar to FIG. 23, except depicting the weighing device in a second condition and depicting movement of the container in the second direction.

Since the one-way rollers 782A and 782B resist rolling engagement by the container 3 in directions other than the first direction 785, movement of the container 3 in a second direction, such as is indicated at the arrow 786 in FIGS. 25 and 26, causes the one-way rollers 782A and 782B to resist the clockwise rotation thereof on the eccentric elements 780A and 780B. Friction between the container frame 34 and at least the one-way roller 782A results in the entire pivot apparatus 722 pivoting in the clockwise direction as is indicated at the arrow 787 in FIG. 26 until the pivot apparatus 722 reaches its second position, as is indicated generally in FIGS. 26 and 27.

As can be understood from FIG. 25, movement from the container 3 in the second direction 786 can be accomplished by, for instance, elevating the movable platform 12 slightly and releasing the cable 14 sufficiently to allow the container 3 to travel a short distance in an unloading direction with respect to the movable platform 12. For the sake of illustration, FIG. 25 depicts the container 3 having moved slightly in the second direction 786 without the pivot apparatuses 722 having yet begun to pivot away from the first position. It is noted, however, that in actual practice the pivot apparatuses 722 likely will have pivoted to their second position upon movement of the container 3 in the second direction 786 by the distance depicted in FIG. 25. Other methodologies can be employed to enable movement in the second direction.

Figure 27:
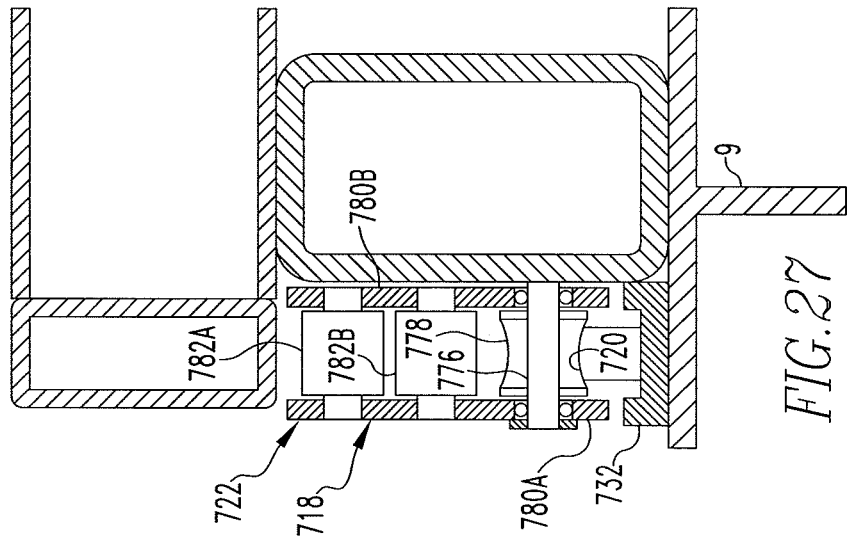
FIG. 27 is a sectional view as taken along line 27-27 of FIG. 26.

Once the pivot apparatuses 722 have pivoted from the first position of FIGS. 23 and 24 to the second positions of FIGS. 26 and 27, the container 3 is no longer engaged with the pivot apparatuses 722 or with the load cells 720, and rather the pivot apparatuses 722 are in their second position as is indicated in FIGS. 26 and 27, wherein the weighing devices 718 are likewise in their second condition. In such a situation, the container 3 is engaged with the movable platform 12 rather than being engaged with the load cells 720.

After the container 3 has been moved in the second direction 786, such as is indicated in FIG. 25, the container 3 can again be fully loaded onto the roll-off truck 2 by retracing the cable 14 and lowering the movable platform 12 onto the vehicle frame 9 in any order. To return the weighing devices 718 from their second condition to their first condition, the container is disengaged from the movable platform 12 and the weighing devices 718 are manually returned to their first condition.

It is noted that the weighing apparatus 1 as well as the roll-off truck 2 with the weighing apparatus 1 and its weighing devices 18, and the alternate embodiments of the weighing apparatus with the weighing devices 118, 218, 318, 418, 518, 618, and 718, have heretofore been described in terms of the method indicated generally in FIG. 8. That is, the loading apparatus 10 has been described as being employed in changing the weighing devices 18, 118, 218, 318, 418, 518, 618, and 718 from their first condition to their second condition. As will be understood from an alternate embodiment in FIGS. 28-30, however, the container 3 can be disengaged from the weighing apparatus 1 and engaged with the movable platform 12 of the roll-off truck 2 substantially without the use of the loading apparatus 10.

More particularly, FIGS. 28 and 29 depict another alternative improved weighing device 818 that can be used in a weighing apparatus in accordance with a ninth embodiment of the disclosed and claimed concept. As will be set forth in greater detail below, the weighing device 818 uses a pair of inclined elements which can be cooperated with one another while the container 3 is engaged therewith to move the weighing device 818 from its first condition to its second condition. In this regard, it is expressly noted that the weighing device 18, and many of the variations thereof described herein, as well as other variations not expressly described herein, can be moved from the first condition to the second condition without previously disengaging the container 3 from the weighing device 18. Examples will be set forth in greater detail below. Moreover, it is understood that the weighing device 818 that will be described below can alternatively be used according to the methodology set forth in FIG. 8, i.e., in conjunction with disengaging the container 3 from the weighing device 818 before changing it from its first condition to its second condition, depending upon the needs of the given application.

The weighing device 818 includes a load cell 820, a support element 822, and a bracket 832. The support element 822 is in the form of a wedge apparatus that includes a first wedge 888, a second wedge 889, a retention apparatus 890, and an advancement apparatus 891. The first wedge 888 has a generally planar engagement surface 893 that is engageable by the container frame 34, and further includes a generally planar sliding surface 894 that is oriented oblique to the engagement surface 893. As employed herein, the expression "oblique" and variations thereof shall refer broadly to a relationship that is neither parallel nor perpendicular. The second wedge 889 likewise includes a generally planar engagement surface 895 that is engageable with the load cell 820 and a generally planar sliding surface 896 that is slidingly engageable with the sliding surface 894. The engagement surface 895 and the sliding surface 896 are likewise oriented oblique to one another.

The retention apparatus 890 depicted in FIGS. 28 and 29 includes a pair of pins 897 disposed on the first wedge 888 that are movably disposed within an elongated opening 898 formed on the bracket 832. The advancement apparatus 891 is depicted as including a helical threaded element 899 that is threadably cooperable with the bracket 832 and which, when rotated, advances itself in the horizontal direction to the left and to the right, from the perspective of FIGS. 28 and 29.

As can be understood from FIG. 28, the first and second wedges 888 and 889 are engageable with one another to cause the container frame 34 to be engaged with the engagement surface 893 of the first wedge 888 and to cause the engagement surface 895 of the second wedge 889 to be engaged with the load cell 820. In such a fashion, the container 3 is engaged through the first and second wedges 888 and 889 with the load cell 820. Such a condition, as is depicted generally in FIG. 28, can be considered to be a first position of the wedge apparatus 822 and a first condition of the weighing device 818. However, rotation of the helical threaded element 899 as indicated in FIG. 29 advances it to the right from the perspective of FIG. 29 which likewise causes the second wedge 889 to be advanced to the right from the perspective of FIG. 29. Since the sliding surfaces 894 and 896 are cooperable with one another, translation of the second wedge 889 to the right in FIG. 29 causes the first wedge 888 to translate in a downward direction from the perspective of FIG. 29, with the pair of pins 897 translating within the elongated opening 898 to retain the first wedge 888 on the bracket 832.

As can be understood from FIGS. 28 and 29, the container 3 was engaged with the first and second wedges 888 and 889 and with the load cell 820 during the initial rotation of the helical threaded element 899 in traveling from the first position of the wedge apparatus 822 of FIG. 28 toward the second position of the wedge apparatus 822 in FIG. 29. Such engagement between the container 3 and the weighing device 818 contained until the container 3 had dropped sufficiently that it became engaged with the movable platform 12. Once the container 3 became engaged with the movable platform 12, the container became disengaged from the first wedge 888, the second wedge 889, and the load cell 820, and further rotation of the helical threaded element 899 would eventually cause the formation of a visible space between the container frame 34 and the engagement surface 893 as is indicated in FIG. 29. It thus can be seen that the weighing device 818 is moved from its first condition to its second condition without involvement of the loading apparatus 10.

Rotation of the helical threaded element 899 could be accomplished through the use of an appropriate tool. Moreover, it is noted that the helical threaded element 899 could, in other embodiments, be configured in other fashions, such as by having it be directly engaged between the first and second wedges 888 and 889, by having it possess a threaded relationship with the first or second wedges 888 and 889, and the like. Moreover, it is noted that the advancement apparatus 891 could be configured with an advancement structure other than the helical threaded element 899 without departing from the present concept.

Figure 30:
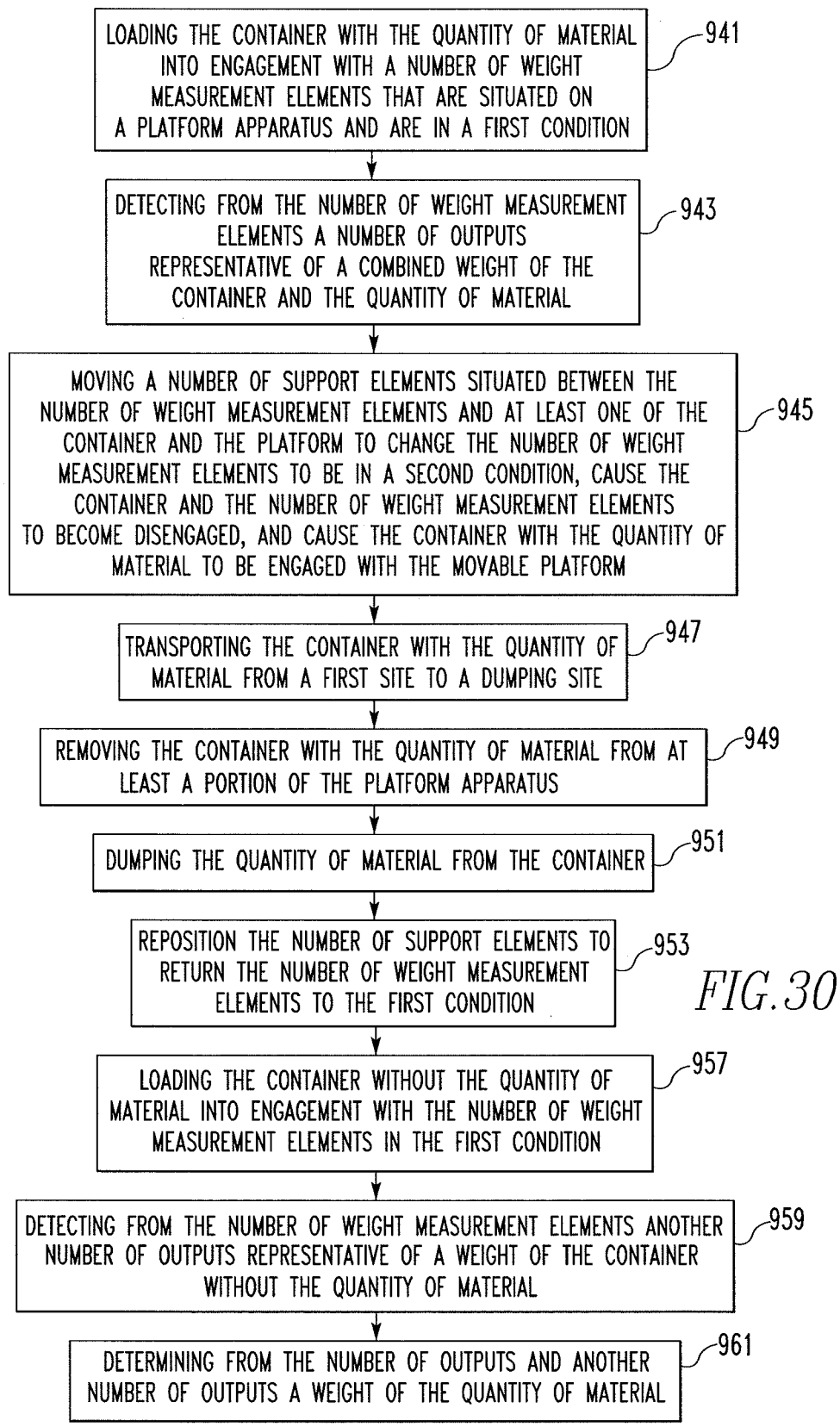
FIG. 30 is a flowchart depicting certain aspects of an improved method in accordance with another embodiment of the disclosed and claimed concept.

An improved method in accordance with another embodiment of the disclosed and claimed concept is indicated generally in FIG. 30. The method begins, as at 441, with the container 3 having the quantity of material disposed in its receptacle 4 being loaded into engagement with a number of weight measurement elements 818 that are situated on the platform apparatus 8 on the roll-off truck 2. A number of outputs would then be detected, as at 943, from the load cells 820. Such outputs are representative of a combined weight of the container 3 and the quantity of material contained therein.

Processing continues, as at 945, with the moving of a number of support elements such as the wedge apparatus 822 that is disposed between the load cells 820 and at least one of the container 3 and the platform apparatus 8. Such moving causes the load cells 820 to be changed from their first condition to be in their second condition, and also causes the container 3 and the load cells 820 to become disengaged, and further causes the container 3 with the quantity of material to become engaged with the movable platform 12. The roll-off truck 2 with its container 3 having the quantity of material contained therein is then transported from the initial site to a dumping site, as at 947. Then, as at 949, the container 3 with the quantity of material is removed from the platform apparatus 8, and the quantity of material within the container 3 is then dumped, as at 951, from the container.

An operator then repositions, as at 953, the support element such as the wedge apparatus 822 to return it from its second position to its first position and to return the weighing devices 818 from their second condition to their first condition. The container 3 without the quantity of material is then loaded into engagement with the number of load cells 820 in their first condition, as at 957. A number of output signals are then detected, as at 959, that are representative of a weight of the container 3 without the quantity of material being contained therein. It is then determined, as at 961, from the outputs at 943 and 959 a net weight of the quantity of material that had been contained in the container 3, with such determination typically being based upon subtracting a weight that has been determined based upon the signals received at 959 from a combined weight that has been determined based upon the signals detected at 943.

As suggested above, the weighing device 818 can be employed in conjunction with the methodology described in FIG. 8. Moreover, it is expressly noted that the weighing devices 18, 118, 318, 418, 518, and 618 can certainly be used in conjunction with the methodology described in FIG. 30. For instance, the plate 22 in FIG. 4 could simply be knocked out by an operator through the use of a hammer and a tool to cause the weighing device to be switched from the first condition to the second condition. The same can be said of the weighing device 118. The tool 346 can be used to rotate the helical thread element 322 to lower the load cell 320 while the container 3 is engaged therewith until the container 3 and the load cell 320 are disengaged. Moreover, the lever 422, depending upon the configuration thereof, potentially could be pivoted or at least released while the container 3 is engaged with the load cell 420 to cause the weighing device 418 to switch from the first condition to the second condition. The rod 522 could be pivoted from its first position in FIG. 17 to its second position in FIG. 18 while the rod 522 is engaged between the container 3 and the load cell 520. Moreover, the pivot apparatus 622 could be pivoted from its position in FIGS. 19 and 20 to its position in FIGS. 21 and 22 while the container 3 is engaged with the eccentric surface of the eccentric element 668.

It is also noted that the various devices are described herein in a schematic fashion and are not intended to be viewed as being limiting. Various combinations of the elements herein can be employed for their intended purposes without departing from the present concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A weighing apparatus that is structured to be mounted to a platform apparatus of a roll-off truck, the platform apparatus having a vehicle frame and a movable platform, the weighing apparatus further being structured to determine a weight of a quantity of material that is situated in a container which is structured to be disposed on the roll-off truck, the weighing apparatus comprising:
   a number of weighing devices that comprise a number of weight measurement elements and a number of support elements;
   the number of weight measurement elements being changeable between a first condition and a second condition and being structured to be situated on at least one of the vehicle frame and the movable platform in the first and second conditions;
   the number of weight measurement elements in the first condition being structured to be engaged by the container with the quantity of material and to generate a number of outputs representative of a combined weight of the container and the quantity of material;
   the number of support elements being movable between a first position in which the number of weight measurement elements are in the first condition and a second position in which the number of weight measurement elements are in the second condition;

the number of support elements in the first position being engaged with the number of weight measurement elements;

the number of support elements in at least the first position being structured to be further engaged with at least one of the container, the vehicle frame, and the movable platform;

the number of support elements being structured to be movable from the first position toward the second position when the container is removed from engagement with the number of weight measurement elements;

the number of weight measurement elements in the second condition being structured to be disengaged from the container when the container is engaged with the platform apparatus;

the number of support elements being structured to be returnable from the second position to the first position when at least a portion of the movable platform is spaced from the vehicle frame; and the number of weight measurement elements returned to the first condition being structured to be engaged by the container without the quantity of material and to generate another number of outputs representative of a weight of the container without the quantity of material;

the number of support elements each comprising a removable plate element that is structured to be interposed between at least a first weight measurement element of the number of weight measurement elements in the first condition and at least one of the container, the vehicle frame, and the movable platform, the removable plate element being structured to be removable from between the at least first weight measurement element and the at least one of the container, the vehicle frame, and the movable platform to change the at least first weight measurement element to the second condition.

2. The apparatus of claim 1 wherein the number of support elements further comprise at least a first bracket structured to be mounted to the vehicle frame and to fixedly support the at least first weight measurement element on the vehicle frame, the at least first weight measurement element being structured to be in the first condition when the removable plate element is interposed between the at least first weight measurement element and the container.

3. A method of determining a weight of a quantity of material that is situated in a container, the method comprising:

loading the container with the quantity of material into engagement with a number of weight measurement elements that are situated on a platform apparatus and are in a first condition;

detecting from the number of weight measurement elements a number of outputs representative of a combined weight of the container and the quantity of material;

removing the container with the quantity of material from the number of weight measurement elements to cause the container and the number of weight measurement elements to become disengaged;

subsequent to the removing of the container with the quantity of material from the number of weight measurement elements, removing a number of removable support elements from a weighing position situated between:
the number of weight measurement elements, and
at least one of the container and the platform apparatus, to change the number of weight measurement elements to be in a second condition;

loading the container with the quantity of material onto the platform apparatus with the number of weight measurement elements in the second condition and disengaged from the container;

moving the container with the quantity of material away from at least a portion of the platform apparatus;

repositioning the number of removable support elements to the weighing position to return the number of weight measurement elements to the first condition subsequent to the moving of the container with the quantity of material away from at least a portion of the platform apparatus;

loading the container without the quantity of material into engagement with the number of weight measurement elements in the first condition;

detecting from the number of weight measurement elements another number of outputs representative of a weight of the container without the quantity of material; and determining from the number of outputs and the another number of outputs a weight of the quantity of material.

4. A method of determining a weight of a quantity of material that is situated in a container, the method comprising:

loading the container with the quantity of material into engagement with a number of weight measurement elements that are situated on a platform apparatus and are in a first condition;

detecting from the number of weight measurement elements a number of outputs representative of a combined weight of the container and the quantity of material;

removing the container with the quantity of material from the number of weight measurement elements to cause the container and the number of weight measurement elements to become disengaged;

subsequent to the removing of the container with the quantity of material from the number of weight measurement elements, moving a number of support elements situated between:
the number of weight measurement elements, and
at least one of the container and the platform apparatus, to change the number of weight measurement elements to be in a second condition;

loading the container with the quantity of material onto the platform apparatus with the number of weight measurement elements in the second condition and disengaged from the container;

moving the container with the quantity of material away from at least a portion of the platform apparatus;

repositioning the support element to return the number of weight measurement elements to the first condition subsequent to the moving of the container with the quantity of material away from at least a portion of the platform apparatus;

loading the container without the quantity of material into engagement with the number of weight measurement elements in the first condition;

detecting from the number of weight measurement elements another number of outputs representative of a weight of the container without the quantity of material;

determining from the number of outputs and the another number of outputs a weight of the quantity of material; and wherein the moving of the number of support elements comprises removing at least a first plate element from between at least a first weight measurement element of the number of weight measurement elements and at least one of the container, the vehicle frame, and the movable platform.

\* \* \* \* \*

UNITED STATES PATENT AND TRADEMARK OFFICE
CERTIFICATE OF CORRECTION

| | | |
|---|---|---|
| PATENT NO. | : 8,716,609 B2 | Page 1 of 1 |
| APPLICATION NO. | : 13/230951 | |
| DATED | : May 6, 2014 | |
| INVENTOR(S) | : John Alan Pangrazio et al. | |

Figure 8B:
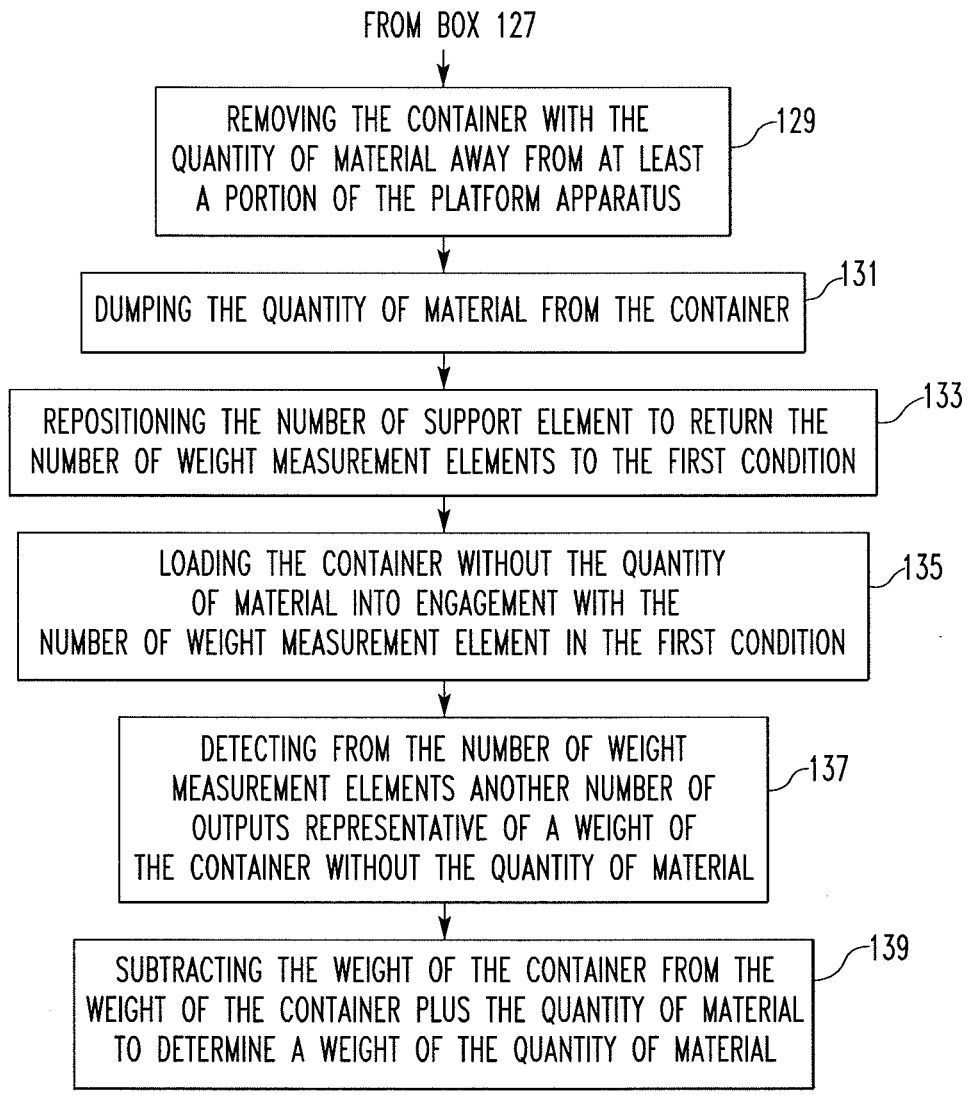

It is certified that error appears in the above-identified patent and that said Letters Patent is hereby corrected as shown below:

In the Drawings
Sheet 9, FIG. 8B, line 9, "SUPPORT ELEMENT" should read --SUPPORT ELEMENTS--.
Sheet 9, FIG. 8B, line 14, "MEASUREMENT ELEMENT" should read --MEASUREMENT ELEMENTS--.

In the Specification
Column 9, line 63, "lowered into engaged" should read --lowered into engagement--.
Column 11, line 45, "being engaging" should read --being engaged--.
Column 15, line 1, "plate 122 are" should read --plate 122 is--.
Column 16, line 24, "pint 452" should read --pin 452--.
Column 17, line 17, "562A and 562B" should read --560A and 560B--.
Column 18, line 19, "on conjunction" should read --in conjunction--.
Column 18, line 39, "element" should read --elements--.
Column 21, line 34, "441" should read --941--.
Column 22, line 9, "18, 118, 318, 418, 518 and 618" should read --18, 118, 218, 318, 418, 518, 618 and 718--.

Signed and Sealed this
Fifteenth Day of September, 2015

Michelle K. Lee
*Director of the United States Patent and Trademark Office*